United States Patent
Hang et al.

(10) Patent No.: US 11,804,924 B2
(45) Date of Patent: Oct. 31, 2023

(54) SEARCH SPACE BLIND DETECTION METHOD AND COMMUNICATION APPARATUS

(71) Applicant: HUAWEI TECHNOLOGIES CO., LTD., Shenzhen (CN)

(72) Inventors: Haicun Hang, Shanghai (CN); Shibin Ge, Shanghai (CN); Liuliu Ji, Shanghai (CN); Xiaohan Wang, Shanghai (CN); Xiaoyan Bi, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 179 days.

(21) Appl. No.: 17/408,941

(22) Filed: Aug. 23, 2021

(65) Prior Publication Data

US 2021/0385008 A1 Dec. 9, 2021

Related U.S. Application Data

(63) Continuation of application No. PCT/CN2020/076679, filed on Feb. 25, 2020.

(30) Foreign Application Priority Data

Feb. 25, 2019 (CN) .......................... 201910139149.0

(51) Int. Cl.
*H04J 3/14* (2006.01)
*H04L 1/00* (2006.01)

(52) U.S. Cl.
CPC .................................. *H04L 1/0038* (2013.01)

(58) Field of Classification Search
CPC ... H04L 1/0038; H04L 5/0053; H04L 5/0094; H04L 1/0026

(Continued)

(56) References Cited

U.S. PATENT DOCUMENTS

2012/0281576 A1* 11/2012 Yamada ................ H04W 48/12
370/252
2016/0150539 A1 5/2016 Xu et al.
(Continued)

FOREIGN PATENT DOCUMENTS

CN 108024382 A 5/2018
CN 108270535 A 7/2018
(Continued)

OTHER PUBLICATIONS

LG Electronics: "PDCCH enhancements for NR URLLC", 3GPP Draft; R1-1812572, Nov. 3, 2018 (Nov. 3, 2018), XP051478802, total 5 pages.

(Continued)

*Primary Examiner* — Chuong T Ho
(74) *Attorney, Agent, or Firm* — Maier & Maier, PLLC

(57) ABSTRACT

A search space blind detection method and a communication apparatus. The method includes: a terminal receives indication information that corresponds to a first search space set and that is sent by a network device, where the indication information is used to indicate one or more search space groups, one search space group includes at least two search spaces having an association relationship, and at least one search space in one search space group belongs to the first search space set; and then, the terminal determines, based on the indication information, a quantity of blind detection times corresponding to the first search space set. The quantity of blind detection times corresponding to the first search space set is determined by considering an association relationship between a plurality of search spaces.

17 Claims, 17 Drawing Sheets

(58) Field of Classification Search
USPC .................................... 370/252, 253, 254
See application file for complete search history.

(56) References Cited

U.S. PATENT DOCUMENTS

| | | | |
|---|---|---|---|
| 2017/0099674 A1* | 4/2017 | Han | H04W 72/20 |
| 2019/0191360 A1* | 6/2019 | Sun | H04L 5/0051 |
| 2019/0254025 A1* | 8/2019 | Lee | H04L 5/0053 |
| 2021/0037607 A1* | 2/2021 | Hamidi-Sepehr | H04L 5/001 |
| 2021/0168782 A1* | 6/2021 | Hamidi-Sepehr | H04W 72/0446 |
| 2022/0182860 A1* | 6/2022 | Chatterjee | H04L 5/0007 |
| 2022/0201515 A1* | 6/2022 | Chatterjee | H04L 1/0038 |
| 2022/0330245 A1* | 10/2022 | Hang | H04W 72/0453 |
| 2022/0361022 A1* | 11/2022 | Cheng | H04W 24/08 |

FOREIGN PATENT DOCUMENTS

| | | |
|---|---|---|
| CN | 108282291 A | 7/2018 |
| CN | 108737018 A | 11/2018 |
| CN | 108809451 A | 11/2018 |
| CN | 109286968 A | 1/2019 |
| CN | 109286983 A | 1/2019 |
| KR | 20180113244 A | 10/2018 |
| KR | 20190014093 A | 2/2019 |
| WO | 2018203681 A1 | 11/2018 |

OTHER PUBLICATIONS

Interdigital Inc: "On Potential PDCCH Enhancements for URLLC", 3GPP Draft; R1-1900803, Jan. 12, 2019 (Jan. 12, 2019), XP051576341, total 12 pages.

ZTE, On USS monitoring after dedicated NPRACH SR transmission. 3GPP TSG RAN WG1 Meeting #95, Spokane, USA, Nov. 12-16, 2018, R1-1812763; 7 pages.

MediaTek Inc., Analysis on (E)PDCCH search space design in coverage enhancement mode. 3GPP TSG-RAN WG1 #76, Prague, Czech Republic, Feb. 10-14, 2014, R1-140240; 5 pages.

3GPP TS 38.213 V15.4.0 (Dec. 2018), 3rd Generation Partnership Project; Technical Specification Group Radio Access Network; NR; Physical layer procedures for control(Release 15); 104 pages.

* cited by examiner

SEARCH SPACE BLIND DETECTION METHOD AND COMMUNICATION APPARATUS

CROSS-REFERENCE TO RELATED APPLICATIONS

This application is a continuation of International Application No. PCT/CN2020/076679, filed on Feb. 25, 2020, which claims priority to Chinese Patent Application No. 201910139149.0, filed on Feb. 25, 2019. The disclosures of the aforementioned applications are hereby incorporated by reference in their entireties.

TECHNICAL FIELD

The embodiments relate to the field of communication technologies, and in particular, to a search space blind detection method and a communication apparatus.

BACKGROUND

With rapid development of mobile communication technologies, a communication system has a higher requirement for reliability. Using an ultra-reliable low-latency communication (uRLLC) service in a 5th generation (5G) communication system as an example, reliability required by the uRLLC service reaches 99.999%. To meet the requirement for high reliability, it is considered in the industry that a physical downlink control channel (PDCCH) repetition solution is adopted to improve reliability of a PDCCH, that is, same downlink control information (DCI) is sent in different search spaces (SS) to improve a success rate of DCI blind detection.

Currently, a blind detection procedure of a terminal cannot meet a blind detection requirement in a PDCCH repetition scenario. Therefore, the blind detection procedure needs to be improved accordingly.

SUMMARY

The embodiments provide a search space blind detection method and a communication apparatus, to improve a current blind detection procedure, so that the blind detection procedure is applied to a PDCCH repetition scenario.

According to a first aspect, a search space blind detection method is provided. The method includes: a terminal receives first indication information corresponding to a first search space set, where the first indication information is used to indicate one or more search space groups, one search space group includes at least two search spaces having an association relationship, and at least one search space in one search space group belongs to the first search space set; and the terminal determines, based on the first indication information, a quantity of blind detection times corresponding to the first search space set. Based on the foregoing solution, the quantity of blind detection times corresponding to the first search space set is determined based on the first indication information, and the first indication information is used to indicate a search space group. That is, the quantity of blind detection times corresponding to the first search space set is determined by considering an association relationship between a plurality of search spaces. Therefore, the quantity of blind detection times corresponding to the first search space set is applicable to a scenario in which a plurality of search spaces carry same DCI (namely, a PDCCH repetition scenario).

According to a second aspect, a search space blind detection method is provided. The method includes: a network device determines one or more search space groups, where one search space group includes at least two search spaces having an association relationship, and at least one search space in one search space group belongs to the first search space set; the network device determines, based on the one or more search space groups, a quantity of blind detection times corresponding to the first search space set; and the network device sends second indication information to a terminal, where the second indication information is used to indicate the quantity of blind detection times corresponding to the first search space set. Based on the foregoing solution, the quantity of blind detection times corresponding to the first search space set is determined based on a search space group corresponding to the first search space set. That is, the quantity of blind detection times corresponding to the first search space set is determined by considering an association relationship between a plurality of search spaces. Therefore, the quantity of blind detection times that corresponds to the first search space set and that is learned of by the terminal by using the second indication information can be applicable to a scenario in which a plurality of search spaces carry same DCI (namely, a PDCCH repetition scenario).

With reference to the second aspect, in a possible implementation, the method further includes: the network device sends first indication information to the terminal, where the first indication information is used to indicate one or more search space groups, one search space group includes at least two search spaces having an association relationship, and at least one search space in one search space group belongs to the first search space set. In this way, the terminal can determine, based on the first indication information, one or more search space groups corresponding to the first search space set, so that the terminal can determine, based on the one or more search space groups, how to perform joint blind detection.

According to a third aspect, a search space blind detection method is provided. The method includes: a terminal receives second indication information, where the second indication information is used to indicate a quantity of blind detection times corresponding to a first search space set; and the terminal determines, based on the second indication information, the quantity of blind detection times corresponding to the first search space set.

With reference to the third aspect, in a possible implementation, the method further includes: the terminal receives first indication information corresponding to the first search space set, where the first indication information is used to indicate at least one search space group corresponding to the first search space set, one search space group includes at least two search spaces having an association relationship, and at least one search space in one search space group belongs to the first search space set.

With reference to the first aspect to the third aspect, in a possible implementation, the quantity of blind detection times corresponding to the first search space set is determined based on a quantity of search spaces included in the first search space set, a quantity of first search spaces included in each search space group in the at least one search space group corresponding to the first search space set, and a quantity of second search spaces included in each search space group in the at least one search space group corresponding to the first search space set.

With reference to the first aspect to the third aspect, in a possible implementation, the quantity of blind detection times corresponding to the first search space set is determined based on a quantity of search spaces included in the first search space set, a quantity of first search spaces in each search space group in the at least one search space group corresponding to the first search space set, and a quantity of search space groups that do not include a third search space and that are in the at least one search space group corresponding to the first search space set.

With reference to the first aspect to the third aspect, in a possible implementation, the at least one search space group includes at least one of a first search space group, a second search space group, and a third search space group. The first search space group includes one first search space and one second search space; the second search space group includes one first search space and one second search space; and the third search space group includes one first search space and one third search space. The first search space belongs to the first search space set, the second search space belongs to a second search space set, and the third search space belongs to a third search space set; an index of the first search space set is less than an index of the second search space set; and the index of the first search space set is greater than an index of the third search space set.

With reference to the first aspect to the third aspect, in a possible implementation, the quantity of blind detection times corresponding to the first search space set is determined based on a quantity of candidate PDCCHs in the first search space set and a quantity of first search space groups. Based on the implementation, when the terminal performs blind detection on the first search space set, joint blind detection is performed once on the two first search spaces in the first search space set; and independent blind detection is performed once on each candidate PDCCH included in the first search space set.

With reference to the first aspect to the third aspect, in a possible implementation, the quantity of blind detection times corresponding to the first search space set is determined based on a quantity of candidate PDCCHs in the first search space set, a quantity of first search space groups, and a quantity of second search space groups. Based on the implementation, when the terminal performs blind detection on the first search space set, joint blind detection is performed once on the two first search spaces in the first search space set; joint blind detection is performed once on the first search space set and the second search space set in the second search space set; and independent blind detection is performed once on each candidate PDCCH included in the first search space set.

With reference to the first aspect to the third aspect, in a possible implementation, the quantity of blind detection times corresponding to the first search space set is determined based on a quantity of candidate PDCCHs in the first search space set, a quantity of first search space groups, and a quantity of third search space groups. Based on the implementation, when the terminal performs blind detection on the first search space set, joint blind detection is performed once on the two first search spaces in the first search space group; and joint blind detection is performed once on the first search space and the second search space in the second search space group.

With reference to the first aspect to the third aspect, in a possible implementation, the quantity of blind detection times corresponding to the first search space set is equal to a quantity of candidate PDCCHs in the first search space set. Based on the implementation, when the terminal performs blind detection on the first search space set, independent blind detection is performed once on a first search space with a greatest index in the first search space group, and joint blind detection is performed once on the two first search spaces in the first search space group. Joint blind detection is performed once on the first search space and the second search space in the second search space group. Independent blind detection is performed once on the first search space in the third search space group.

With reference to the first aspect to the third aspect, in a possible implementation, a plurality of search spaces included in the search space group have a same aggregation level. In this way, complexity of the search space group can be reduced.

It should be noted that, in the first aspect, a quantity of first search space groups, a quantity of second search space groups, and a quantity of third search space groups may be determined based on the first indication information.

According to a fourth aspect, a terminal is provided. The terminal includes: a communication module and a processing module. The communication module is configured to receive indication information corresponding to a first search space set, where the indication information is used to indicate one or more search space groups, one search space group includes at least two search spaces having an association relationship, and at least one search space in one search space group belongs to the first search space set; and the processing module is configured to determine, based on the indication information, a quantity of blind detection times corresponding to the first search space set.

In a possible implementation, the processing module is configured to: determine, based on the indication information, a quantity of first search spaces included in each search space group in the at least one search space corresponding to the first search space set and a quantity of second search space groups included in each search space group in the at least one search space group corresponding to the first search space set; and determine the quantity of blind detection times corresponding to the first search space set based on a quantity of search spaces included in the first search space set, the quantity of first search spaces included in each search space group in the at least one search space group corresponding to the first search space set, and the quantity of second search spaces included in each search space group in the at least one search space group corresponding to the first search space set.

In a possible implementation, the processing module is configured to: determine, based on the indication information, a quantity of first search spaces in each search space group in the at least one search space group corresponding to the first search space set and a quantity of search space groups that do not include a third search space and that are in the at least one search space group corresponding to the first search space set; and determine the quantity of blind detection times corresponding to the first search space set based on a quantity of search spaces included in the first search space set, the quantity of first search spaces in each search space group in the at least one search space group corresponding to the first search space set, and the quantity of search space groups that do not include the third search space and that are in the at least one search space group corresponding to the first search space set.

In a possible implementation, the at least one search space group includes at least one of a first search space group, a second search space group, and a third search space group. The first search space group includes one first search space and one second search space; the second search space group includes one first search space and one second search space; and the third search space group includes one first search space and one third search space. The first search space belongs to the first search space set, the second search space belongs to a second search space set, and the third search space belongs to a third search space set; an index of the first search space set is less than an index of the second search space set; and the index of the first search space set is greater than an index of the third search space set.

In a possible implementation, the processing module is configured to: determine a quantity of first search space groups based on the indication information; and determine the quantity of blind detection times corresponding to the first search space set based on a quantity of candidate PDCCHs in the first search space set and the quantity of first search space groups.

In a possible implementation, the processing module is configured to: determine a quantity of first search space groups and a quantity of second search space groups based on the indication information; and determine the quantity of blind detection times corresponding to the first search space set based on a quantity of candidate PDCCHs in the first search space set, the quantity of first search space groups, and the quantity of second search space groups.

In a possible implementation, the processing module is configured to: determine a quantity of first search space groups and a quantity of third search space groups based on the indication information and determine the quantity of blind detection times corresponding to the first search space set based on a quantity of candidate PDCCHs in the first search space set, the quantity of first search space groups, and the quantity of third search space groups.

In a possible implementation, the processing module is further configured to perform joint blind detection on the two first search spaces in the first search space group.

In a possible implementation, the processing module is further configured to perform joint blind detection on the first search space and the second search space in the second search space group.

In a possible implementation, the processing module is configured to determine the quantity of blind detection times corresponding to the first search space set based on a quantity of candidate PDCCHs in the first search space set.

In a possible implementation, the processing module is further configured to: perform independent blind detection on a first search space with a greatest index in the first search space group, and perform joint blind detection on the two first search spaces in the first search space group.

In a possible implementation, the processing module is further configured to perform joint blind detection on the first search space and the second search space in the second search space group.

In a possible implementation, the processing module is further configured to perform independent blind detection on the first search space in the third search space group.

In a possible implementation, a plurality of search spaces included in the search space group have a same aggregation level.

According to a fifth aspect, a terminal is provided. The terminal includes: a communication module and a processing module. The communication module is configured to receive a second indication information, where the second indication information is used to indicate a quantity of blind detection times corresponding to the first search space set. The processing module is configured to determine, based on the second indication information, the quantity of blind detection times corresponding to first search space set.

With reference to the fifth aspect, in a possible implementation, the communication module is further configured to receive first indication information, where the first indication information is used to indicate at least one search space group corresponding to the first search space set, one search space group includes at least two search spaces having an association relationship, and at least one search space in one search space group belongs to the first search space set.

In a possible implementation, the quantity of blind detection times corresponding to the first search space set is determined based on a quantity of search spaces included in the first search space set, a quantity of first search spaces included in each search space group in the at least one search space group corresponding to the first search space set, and a quantity of second search spaces included in each search space group in the at least one search space group corresponding to the first search space set.

In a possible implementation, the quantity of blind detection times corresponding to the first search space set is determined based on a quantity of search spaces included in the first search space set, a quantity of first search spaces in each search space group in the at least one search space group corresponding to the first search space set, and a quantity of search space groups that do not include a third search space and that are in the at least one search space group corresponding to the first search space set.

In a possible implementation, the at least one search space group includes at least one of a first search space group, a second search space group, and a third search space group. The first search space group includes one first search space and one second search space; the second search space group includes one first search space and one second search space; and the third search space group includes one first search space and one third search space. The first search space belongs to the first search space set, the second search space belongs to a second search space set, and the third search space belongs to a third search space set; an index of the first search space set is less than an index of the second search space set; and the index of the first search space set is greater than an index of the third search space set.

In a possible implementation, the quantity of blind detection times corresponding to the first search space set is determined based on a quantity of candidate PDCCHs in the first search space set and a quantity of first search space groups.

In a possible implementation, the quantity of blind detection times corresponding to the first search space set is determined based on a quantity of candidate PDCCHs in the first search space set, a quantity of first search space groups, and a quantity of second search space groups.

In a possible implementation, the quantity of blind detection times corresponding to the first search space set is determined based on a quantity of candidate PDCCHs in the first search space set, a quantity of first search space groups, and a quantity of third search space groups. Based on the implementation, the processing module is further configured to perform joint blind detection on the two first search spaces in the first search space group. The processing module is further configured to perform joint blind detection on the first search space and the second search space in the second search space group.

In a possible implementation, the quantity of blind detection times corresponding to the first search space set is equal to a quantity of candidate PDCCHs in the first search space set. Based on the implementation, the processing module is further configured to: perform independent blind detection on a first search space with a greatest index in the first search space group, and perform joint blind detection on the two first search spaces in the first search space group. The processing module is further configured to perform joint blind detection on the first search space and the second search space in the second search space group. The processing module is further configured to perform independent blind detection on the first search space in the third search space group.

In a possible implementation, a plurality of search spaces included in the search space group have a same aggregation level.

According to a sixth aspect, a terminal is provided. The terminal includes a processor, where the processor is configured to be coupled to a memory, read instructions in the memory, and implement, based on the instructions, the search space blind detection method according to the first aspect or the third aspect.

According to a seventh aspect, a computer-readable storage medium is provided. The computer-readable storage medium stores instructions, and when the instructions are run on a terminal, the terminal is enabled to perform the search space blind detection method according to the first aspect or the third aspect.

According to an eighth aspect, a computer program product including instructions is provided. When the computer program product runs on a communication apparatus, a terminal is enabled to perform the search space blind detection method according to the first aspect or the third aspect.

According to a ninth aspect, a chip is provided. The chip includes a processing module and a communication interface, where the communication interface is configured to transmit received code instructions to the processing module, and the processing module is configured to run the code instructions to support a terminal in performing the search space blind detection method according to the first aspect or the third aspect. The code instructions may be from a memory inside the chip, or may be from a memory outside the chip. Optionally, the processing module may be a processor, a microprocessor, or an integrated circuit integrated on the chip. The communication interface may be an input/output circuit or a transceiver pin on the chip.

According to a tenth aspect, a network device is provided. The network device includes: a communication module and a processing module. The processing module is configured to: determine one or more search space groups, where one search space group includes at least two search spaces having an association relationship, and at least one search space in one search space group belongs to a first search space set; and determine, based on the one or more search space groups, a quantity of blind detection times corresponding to the first search space set. The communication module is configured to send a second indication information to a terminal, where the second indication information is used to indicate the quantity of blind detection times corresponding to the first search space set.

In a possible implementation, the communication module is further configured to send first indication information to the terminal, where the first indication information is used to indicate one or more search space groups, one search space group includes at least two search spaces having an association relationship, and at least one search space in one search space group belongs to the first search space set.

In a possible implementation, the processing module is configured to: determine a quantity of first search spaces included in each search space group in the at least one search space group corresponding to the first search space set and a quantity of second search space groups included in each search space group in the at least one search space group corresponding to the first search space set; and determine the quantity of blind detection times corresponding to the first search space set based on a quantity of search spaces included in the first search space set, the quantity of first search spaces included in each search space group in the at least one search space group corresponding to the first search space set, and the quantity of second search spaces included in each search space group in the at least one search space group corresponding to the first search space set.

In a possible implementation, the processing module is configured to: determine a quantity of first search spaces in each search space group in the at least one search space corresponding to the first search space set and a quantity of search space groups that do not include a third search space and that are in the at least one search space group corresponding to the first search space set; and determine the quantity of blind detection times corresponding to the first search space set based on a quantity of search spaces included in the first search space set, the quantity of first search spaces in each search space group in the at least one search space group corresponding to the first search space set, and the quantity of search space groups that do not include the third search space and that are in the at least one search space group corresponding to the first search space set.

In a possible implementation, the at least one search space group includes at least one of a first search space group, a second search space group, and a third search space group. The first search space group includes one first search space and one second search space; the second search space group includes one first search space and one second search space; and the third search space group includes one first search space and one third search space. The first search space belongs to the first search space set, the second search space belongs to a second search space set, and the third search space belongs to a third search space set; an index of the first search space set is less than an index of the second search space set; and the index of the first search space set is greater than an index of the third search space set.

In a possible implementation, the processing module is configured to determine the quantity of blind detection times corresponding to the first search space set based on a quantity of candidate PDCCHs in the first search space set and a quantity of first search space groups. Based on the implementation, when the terminal performs blind detection on the first search space set, joint blind detection is performed once on the two first search spaces in the first search space set; and independent blind detection is performed once on each candidate PDCCH included in the first search space set.

In a possible implementation, the processing module is configured to determine the quantity of blind detection times corresponding to the first search space set based on a quantity of candidate PDCCHs in the first search space set, a quantity of first search space groups, and a quantity of second search space groups. Based on the implementation, when the terminal performs blind detection on the first search space set, joint blind detection is performed once on the two first search spaces in the first search space set; joint blind detection is performed once on the first search space set and the second search space set in the second search space set; and independent blind detection is performed once on each search space (in other words, candidate PDCCH) included in the first search space set.

In a possible implementation, the processing module is configured to determine the quantity of blind detection times corresponding to the first search space set based on a quantity of candidate PDCCHs in the first search space set, a quantity of first search space groups, and a quantity of third search space groups. Based on the implementation, joint blind detection is performed once on the two first search spaces in the first search space group. In addition, joint blind detection is performed once on the first search space and the second search space in the second search space group.

In a possible implementation, the processing module is configured to determine the quantity of blind detection times corresponding to the first search space set based on a quantity of candidate PDCCHs in the first search space set. Based on the implementation, when the terminal performs blind detection on the first search space set, independent blind detection is performed once on a first search space with a greatest index in the first search space group, and joint blind detection is performed once on the two first search spaces in the first search space group. Joint blind detection is performed once on the first search space and the second search space in the second search space group. Independent blind detection is performed once on the first search space in the third search space group.

In a possible implementation, a plurality of search spaces included in the search space group have a same aggregation level.

According to an eleventh aspect, a network device is provided. The network device includes a processor, where the processor is configured to be coupled to a memory, read instructions in the memory, and implement, based on the instructions, the search space blind detection method according to the second aspect.

According to a twelfth aspect, a computer-readable storage medium is provided. The computer-readable storage medium stores instructions, and when the instructions are run on a network device, the network device is enabled to perform the search space blind detection method according to the second aspect.

According to a thirteenth aspect, a computer program product including instructions is provided. When the computer program product runs on a communication apparatus, a network device is enabled to perform the search space blind detection method according to the second aspect.

According to a fourteenth aspect, a chip is provided. The chip includes a processing module and a communication interface, where the communication interface is configured to transmit received code instructions to the processing module, and the processing module is configured to run the code instructions to support a network device in performing the search space blind detection method according to the second aspect. The code instructions may be from a memory inside the chip, or may be from a memory outside the chip. Optionally, the processing module may be a processor, a microprocessor, or an integrated circuit integrated on the chip. The communication interface may be an input/output circuit or a transceiver pin on the chip.

For effects brought by any implementation manner in the fourth aspect to the fourteenth aspect, refer to the effects in the corresponding method provided above, which are the same as the effects brought by the implementation manner. Details are not described herein again.

DETAILED DESCRIPTION OF THE EMBODIMENTS

Figure 1:
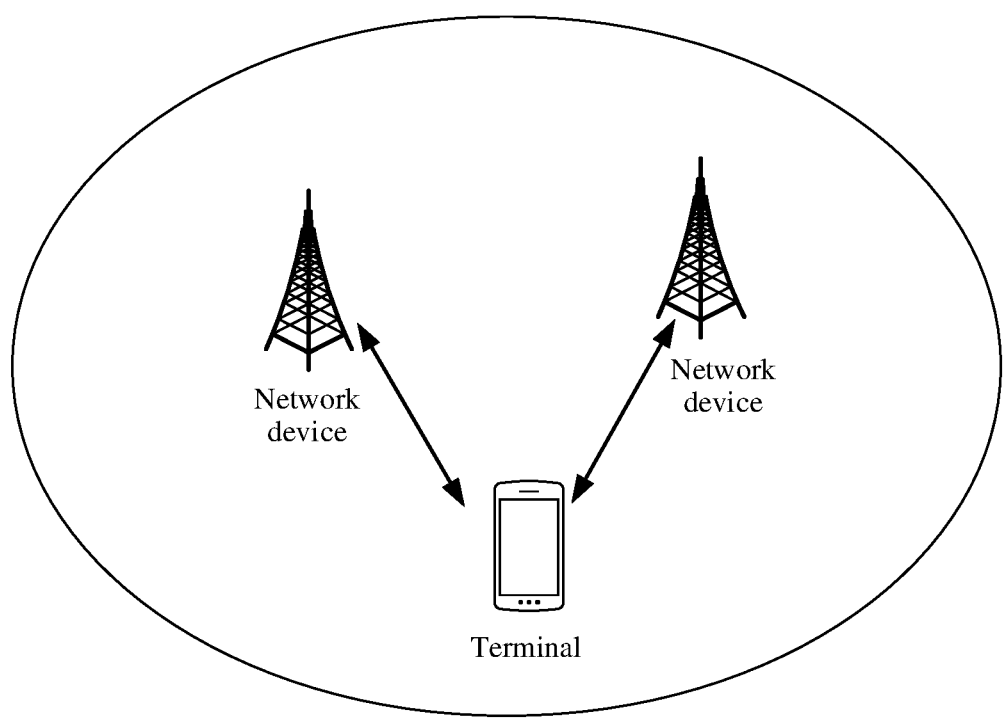
FIG. 1 is a schematic architectural diagram of a communication system according to an embodiment.

To facilitate understanding of the solutions of the embodiments, the following first briefly describes terms used in embodiments.

1. Search Space Set and Search Space

A search space set includes one or more search spaces. One search space is equivalent to one candidate PDCCH. A terminal performs blind detection on the search space to receive a PDCCH.

The search space may be classified into a common search space and a user equipment (UE)-specific search space. The common search space is used to transmit common control information such as paging and system information. The UE-specific search space is used to transmit control information of a UE. Further, the common search space may alternatively be used to transmit control information of a UE. This is not limited in the embodiments.

A time-frequency resource of the search space may be jointly determined by using a control resource set (CORE-SET) configuration parameter and a search space set configuration parameter. For example, the control resource set configuration parameter is used to indicate a frequency domain position and duration of the search space, and the search space set configuration parameter is used to indicate a start position of the search space in time domain, for example, a start slot.

2. Aggregation Level

An aggregation level is an attribute of the search space. The aggregation level is a quantity of control channel elements (CCE) constituting one PDCCH. A plurality of aggregation levels, for example, 1, 2, 4, 8, and 16, are defined in a protocol.

It should be noted that the search space is a group of time-frequency resources. A search space with a lower aggregation level occupies a relatively small quantity of time-frequency resources, and a search space with a higher aggregation level occupies a relatively large quantity of time-frequency resources. If channel quality of a terminal is relatively high, a network device usually uses a search space with a lower aggregation level to carry the PDCCH, to save time-frequency resources; if channel quality of a terminal is relatively low, a network device uses a search space with a higher aggregation level, to ensure reliability of the PDCCH.

3. Index of Search Space Set and Index of Search Space

An index of a search space set is used to uniquely identify the search space set. The index of the search space set is configured by using higher layer signaling.

In the embodiments, the index of the search space is an index of the search space in a search space set. The index of the search space is used to uniquely identify the search space in the search space set.

It should be noted that a higher layer parameter used to configure the index of the search space does not exist in a current communication system. However, a network device and a terminal may sort search spaces in the search space set according to a specific rule, to determine an index of each search space in the search space set. For example, the search spaces in the search space set are first sorted in ascending order of aggregation levels; then search spaces of a same aggregation level are sorted based on start positions or end positions of CCEs of the search spaces, to finally determine the index of each search space in the search space set.

Optionally, for a search space set, an index of a search space may be numbered starting from 0. For example, the search space set includes a search space #0 to a search space #J. It should be noted that, the search space #J refers to a search space whose index is J, where J is a positive integer greater than or equal to 1. Further, the index of the search space may alternatively be numbered starting from another number, or may be numbered in another form, for example, a form of letter. This is not limited in the embodiments. Optionally, the index may also be referred to as a sequence number, a label, a number, or an identifier. This is not limited in the embodiments.

For example, in the embodiments, the search space may be represented as $SS_{(x,y)}$, where x represents an index of a search space set to which the search space belongs, and y represents the index of the search space.

For ease of description, the index of the search space set to which the search space belongs is referred to as a set index of the search space for short below.

4. Search Space Group

A search space group is a combination of a plurality of search spaces having an association relationship. It should be noted that the plurality of search spaces in the search space group may be from a same search space set, or the plurality of search spaces may be from different search space sets. This is not limited in the embodiments.

5. Joint Blind Detection and Independent Blind Detection

Joint blind detection means that a terminal receives information about at least two search spaces having an association relationship, combines the information about the at least two search spaces, and attempts to decode the combined information.

Independent blind detection means that a terminal receives information about a search space and attempts to decode the information about the search space.

6. First Search Space, Second Search Space, and Third Search Space

A first search space belongs to a first search space set, a second search space belongs to a second search space set, and a third search space belongs to a third search space set. An index of the first search space set is less than an index of the second search space set, and the index of the first search space set is greater than an index of the third search space set.

It should be noted that, in the descriptions of the embodiments, unless otherwise specified, "/" means "or". For example, A/B may represent A or B. In addition, "at least one" means one or more, and "a plurality of" means two or more. Words such as "first" and "second" do not limit a quantity and an execution sequence, and the words such as "first" and "second" do not indicate a definite difference.

In the embodiments, words such as "example" or "for example" are used to give an example, an illustration, or descriptions. Any embodiment or design scheme described as an "example" or "for example" should not be explained as being more preferred or having more advantages than another embodiment or design scheme. Exactly, use of the words such as "example" or "for example" is intended to present a related concept in a specific manner.

In the descriptions of the embodiments, the "indication" may include a direct indication and an indirect indication, or may include an explicit indication and an implicit indication. Information indicated by a piece of information (such as first indication information and second indication information described below) is referred to as to-be-indicated information. In a specific implementation process, there are a plurality of manners of indicating the to-be-indicated information. For example, the to-be-indicated information may be directly indicated, where the to-be-indicated information, an index of the to-be-indicated information, or the like is indicated. For another example, the to-be-indicated information may be indirectly indicated by indicating other information, and there is an association relationship between the other information and the to-be-indicated information. For another example, only a part of the to-be-indicated information may be indicated, and the other part of the to-be-indicated information is already known or pre-agreed on. In addition, specific information may also be indicated by using a pre-agreed (for example, stipulated in a protocol) arrangement sequence of various pieces of information, to reduce indication overheads to some extent.

The solutions provided in the embodiments of this application may be used in various communication systems, for example, a new radio (NR) communication system using a 5G communication technology, a future evolved system, and various convergence communication systems. The solutions provided in the embodiments may be used in a plurality of application scenarios, for example, scenarios such as machine to machine (M2M), macro-micro communication, enhanced mobile broadband (eMBB), uRLLC, and massive machine-type communications (mMTC). These scenarios may include but are not limited to: a scenario of communication between communication devices, a scenario of communication between network devices, a scenario of communication between a network device and a communication device, and the like. The following provides descriptions by using an example in which the solutions are applied to a scenario of communication between a network device and a terminal.

FIG. 1 is a schematic diagram of a communication system to which a solution provided in the embodiments is applicable. The communication system may include one or more network devices (where FIG. 1 shows only two network devices) and one or more terminals (where FIG. 1 shows only one terminal). A plurality of network devices may communicate with a same terminal. FIG. 1 is merely a schematic diagram, and does not constitute a limitation on a scenario to which a solution provided in the embodiments is applicable.

The network device may be a base station, a base station controller, or the like in wireless communication. For example, the base station may include various types of base stations, such as a micro base station (also referred to as a small cell), a macro base station, a relay node, and an access point. This is not limited in the embodiments. In the embodiments, the base station may be a base transceiver station (BTS) in a global system for mobile communications (GSM) or code division multiple access (CDMA), a NodeB in wideband code division multiple access (WCDMA), an evolved NodeB (evolutional NodeB, eNB or e-NodeB) in long term evolution (LTE), an eNB in the internet of things (IoT) or the narrowband internet of things (nNB-IoT), or a base station in a future 5G mobile communication network or a future evolved public land mobile network (PLMN). This is not limited in the embodiments.

The terminal is configured to provide a voice service and/or a data connectivity service for a user. The terminal may have different names, for example, UE, an access terminal, a terminal unit, a terminal station, a mobile station, a mobile station, a remote station, a remote terminal, a mobile device, a wireless communication device, a terminal agent, or a terminal apparatus. Optionally, the terminal may be any type of handheld device, vehicle-mounted device, wearable device, or computer that has a communication function. This is not limited in the embodiments. For example, the handheld device may be a smartphone. The vehicle-mounted device may be an in-vehicle navigation system. The wearable device may be a smart band or a virtual reality (VR) device. The computer may be a personal digital assistant (PDA) computer, a tablet computer, or a laptop computer.

In addition, the network architecture and the service scenario described in the embodiments are intended to describe the solutions in the embodiments more clearly, and do not constitute a limitation on the solutions provided in the embodiments. A person of ordinary skill in the art may know that, with the evolution of the network architecture and the emergence of new service scenarios, the solutions provided in the embodiments are also applicable to similar problems.

Figure 2:
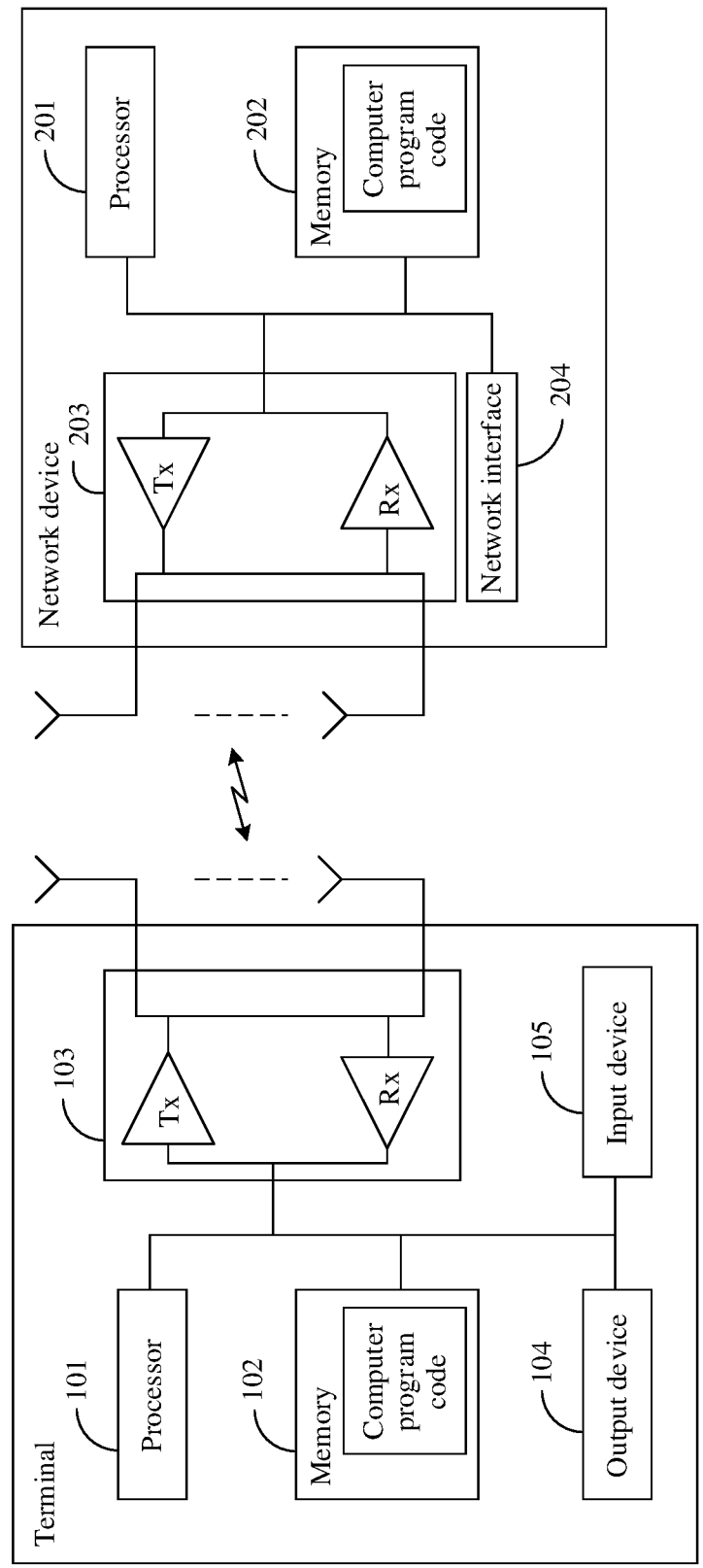
FIG. 2 is a schematic diagram of hardware structures of a terminal and a network device according to an embodiment.

FIG. 2 is a schematic diagram of hardware structures of a network device and a terminal according to an embodiment.

The terminal includes at least one processor 101 and at least one transceiver 103. Optionally, the terminal may further include an output device 104, an input device 105, and at least one memory 102.

The processor 101, the memory 102, and the transceiver 103 are connected through a bus. The processor 101 may be a general-purpose central processing unit (CPU), a microprocessor, an application-specific integrated circuit (ASIC), or one or more integrated circuits configured to control program execution of the solutions of the embodiments. The processor 101 may alternatively include a plurality of CPUs, and the processor 101 may be a single-core (single-CPU) processor or a multi-core (multi-CPU) processor. The processor herein may refer to one or more devices, circuits, or processing cores configured to process data (for example, computer program instructions).

The memory 102 may be a read-only memory (ROM) or another type of static storage device that can store static information and instructions, or a random access memory (RAM) or another type of dynamic storage device that can store information and instructions, or may be an electrically erasable programmable read-only memory (EEPROM), a compact disc read-only memory (CD-ROM) or another compact disc storage, an optical disc storage (including a compact disc, a laser disc, an optical disc, a digital versatile disc, a Blu-ray optical disc, and the like), a magnetic disk storage medium or another magnetic storage device, or any other medium that can be used to carry or store expected program code in a form of instructions or a data structure and that can be accessed by a computer. This is not limited in this embodiment. The memory 102 may exist independently, and is connected to the processor 101 through the bus. The memory 102 may alternatively be integrated with the processor 101. The memory 102 is configured to store application program code for performing the solutions in the embodiments, and the processor 101 controls the execution. The processor 101 is configured to execute the computer program code stored in the memory 102, to implement a method provided in the embodiments.

The transceiver 103 may use any apparatus such as a transceiver, and is configured to communicate with another device or a communication network such as the Ethernet, a radio access network (RAN), or a wireless local area network (WLAN). The transceiver 103 includes a transmitter Tx and a receiver Rx.

The output device 104 communicates with the processor 101, and may display information in a plurality of manners. For example, the output device 104 may be a liquid crystal display (LCD), a light emitting diode (LED) display device, a cathode ray tube (CRT) display device, or a projector. The input device 105 communicates with the processor 101, and may receive an input of a user in a plurality of manners. For example, the input device 105 may be a mouse, a keyboard, a touchscreen device, or a sensing device.

The network device includes at least one processor 201, at least one memory 202, at least one transceiver 203, and at least one network interface 204. The processor 201, the memory 202, the transceiver 203, and the network interface 204 are connected through a bus. The network interface 204 is configured to connect to a core network device through a link (for example, an S1 interface), or connect to a network interface of another network device through a wired or wireless link (for example, an X2 interface) (not shown in the figure). This is not limited in the embodiments. In addition, for related descriptions of the processor 201, the memory 202, and the transceiver 203, refer to the descriptions of the processor 101, the memory 102, and the transceiver 103 in the terminal. Details are not described herein again.

The following describes the solutions in the embodiments with reference to the accompanying drawings.

Embodiment 1

Figure 3:
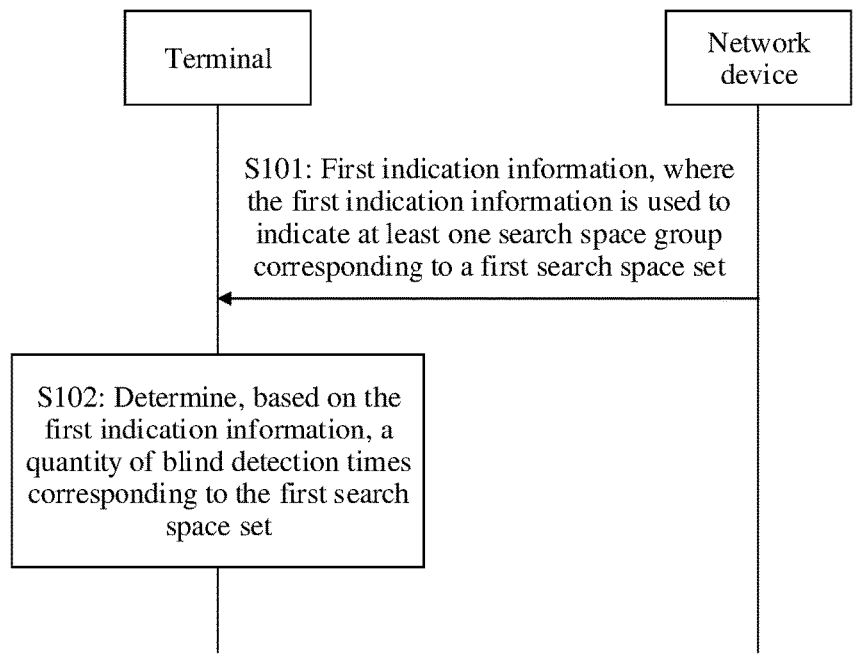
FIG. 3 is a flowchart of a search space blind detection method according to an embodiment.

FIG. 3 shows a search space blind detection method according to an embodiment. The method includes the following steps.

S101: A network device sends first indication information corresponding to a first search space set to a terminal. Correspondingly, the terminal receives the first indication information corresponding to the first search space set.

The first indication information is used to indicate one or more search space groups, one search space group includes a plurality of search spaces having an association relationship, and at least one search space in one search space group belongs to the first search space set. It may be understood that the first search space set is any search space set. This is not limited in this embodiment.

Optionally, the first indication information is carried in radio resource control (RRC) signaling. Alternatively, the first indication information is carried in PDCCH configuration signaling, for example, PDCCH-config.

In an implementation, the first indication information includes information about one or more search space groups. Information about a search space group is used to indicate a search space included in the search space group. For example, the information about the search space group includes information about at least two search spaces. For example, information about a search space includes an index of a search space set to which the search space belongs, and an index of the search space in the search space set. In this implementation, after receiving the first indication information, the terminal may determine, based on the information about one or more search space groups included in the first indication information, a search space group corresponding to the first search space set, that is, determine a plurality of search spaces having an association relationship.

In another implementation, the first indication information includes configuration information of a search space set. The configuration information of the search space set is information about an association relationship between a search space set and a control resource set. For example, the configuration information of the search space set includes an identifier of at least one search space set and an identifier of a corresponding control resource set. Optionally, one search space set may be corresponding to (or associated with) a plurality of control resource sets, or a plurality of search space sets may be corresponding to (or associated with) one control resource set. In addition, a search space group determining rule (or method, or policy) is predefined in a protocol. In this implementation, according to the search space group determining rule predefined in the protocol, the terminal may determine a plurality of associated search spaces (that is, determine a search space group corresponding to the first search space set) based on the received first indication information. In other words, after receiving the first indication information, the terminal may determine, based on the first indication information (namely, the configuration information of the search space set) and according to the search space group determining rule predefined in the protocol, the search space group corresponding to the first search space set, that is, determine the plurality of associated search spaces. The search space group determining rule is described in detail in the following embodiment.

Optionally, search spaces included in the search space group may meet a specific condition. For example, the search spaces included in the search space group are from a same search space set. For another example, the search spaces included in the search space group have a same aggregation level. It may be understood that if the search space group is limited to only including search spaces having the same aggregation level, a possibility that different search spaces form a search space group is reduced, thereby reducing complexity of blind detection by the terminal.

In this embodiment, the association relationship between the plurality of search spaces in the search space group specifically refers to a relationship between DCI carried in the plurality of search spaces in the search space group. For example, the protocol may specify that all search spaces in the search space group are used to carry same DCI. Alternatively, some search spaces in the search space group are used to carry same DCI. This is not limited in this embodiment.

It may be understood that one search space group includes a plurality of search spaces having an association relationship. Regardless of the foregoing implementations, after receiving the first indication information, the terminal may determine, based on the first indication information, the plurality of search spaces having the association relationship in the search space group. Optionally, when the search space group determining rule is predefined in the protocol, how to determine the plurality of search spaces included in the search space group is described as follows. However, this is not limited to the following several implementations. As described above, the plurality of search spaces have the association relationship, and therefore may be referred to as a plurality of search spaces associated with each other or a plurality of associated search spaces.

For example, when the search space group determining rule is predefined in the protocol, the terminal may determine the plurality of associated search spaces in the search space group in the following several optional implementations.

In a first implementation, the plurality of associated search spaces are determined based on that one search space set (SS set, in the following embodiments, the search space set described herein is referred to as a source search space set) is associated with a plurality of control resource sets (CORESET). That is, the terminal determines the plurality of associated search spaces based on the source search space set and the plurality of control resource sets associated with the source search space set.

It should be understood that, when one source search space set is associated with a plurality of control resource sets, the source search space set and each of the plurality of control resource sets may form a search space set (referred to as a search space subset in the following embodiments). In this way, a plurality of search space subsets may be formed, and the plurality of search space subsets further form a new search space set. Some search spaces in the new search space set have an association relationship, and the search spaces having the association relationship form a search space group. For example, one source search space set is associated with C (C is a positive integer greater than or equal to 2) control resource sets. In this way, C search space subsets may be formed, and the C search space subsets form a new search space set. Optionally, this implementation takes effect only when a network delivers indication information to indicate that a PDCCH is repeatedly transmitted, or a network side delivers indication information to indicate that the search spaces are associated.

In a possible implementation, it is assumed that one source search space set is associated with two control resource sets, and the two control resource sets are respectively a control resource set $C_1$ and a control resource set $C_2$. That the terminal determines a plurality of associated search spaces based on the source search space set and the plurality of control resource sets associated with the search space set includes: the terminal determines a first search space subset based on the source search space set (the search space set includes N1 search spaces) and the control resource set $C_1$, where the first search space subset includes: a search space$^{C1}_1$, a search space$^{C1}_2$, . . . , and a search space$^{C1}_{N1}$; the terminal determines a second search space set based on the source search space set and the control resource set $C_2$, where the second search space set includes: a search space$^{C2}_1$, a search space$^{C2}_2$, . . . , and a search space$^{M2}_{N1}$; and the first search subset and the second search subset form a new search space set, where the new search space set includes 2*N1 search spaces. In this case, the search space group determining rule predefined in the protocol may be: there is a one-to-one correspondence association relationship between the N1 search spaces in the first search space subset and N1 search spaces in the second search space subset. In this way, the terminal can determine the search space group.

Optionally, the one-to-one correspondence association relationship may be a one-to-one correspondence between a search space in the first search space subset and a search space in the second search space subset that have a same index number (or a number, a label, an identifier, or the like). For example, a search space$^{C1}_k$ in the first search space subset is associated with a search space$^{C2}_k$ in the second search space subset, and a value range of k is [1, N1].

In another possible implementation, it is assumed that one source search space set is associated with three control resource sets. Then a similar implementation may be used to determine that every three search spaces are associated.

Based on the above, it can be understood that, in the first implementation, a plurality of search spaces in one search space group are from a same search space set (for example, the new search space set formed above).

In a second implementation, the plurality of associated search spaces are determined based on a plurality of source search space sets (SS set) associated with one control resource set (CORESET). That is, the plurality of associated search spaces are determined based on an association relationship between one control resource set and a plurality of source search space sets. In this way, the terminal determines the plurality of associated search spaces based on the control resource set and the plurality of source search space sets associated with the control resource set.

It should be understood that, when one control resource set is associated with a plurality of source search space sets, the control resource set and each of the plurality of source search space sets may form one search space set. In this way, a plurality of new search space sets may be formed. A plurality of search spaces in one search space group are from the plurality of new search space sets.

In a possible implementation, it is assumed that two source search space sets are associated with one control resource set, the two source search space sets are respectively an SS set $O_1$ and an SS set $O_2$, the SS set $O_1$ includes N2 search spaces, and the SS set $O_2$ includes N3 search spaces. That the terminal determines the plurality of associated search spaces based on a control resource set and a plurality of source search space sets associated with the control resource set includes: the terminal determines a search space set 1 based on the SS set $O_1$ and the control resource set, where the search space set 1 includes a search space$^{O1}_1$, a search space$^{O1}_2$, . . . , and a search space$^{O1}_{N2}$; and the terminal determines a search space set 2 based on the SS set $O_2$ and the control resource set, where the search space set 2 includes a search space$^{O2}_1$, a search space$^{O2}_2$, . . . , and a search space$^{O2}_{N3}$. N2 may be equal to or not equal to N3. In this case, the search space group determining rule predefined in the protocol may be: there is a one-to-one correspondence association relationship between K search spaces in the search space set 1 and K search spaces in the search space set 2. Optionally, this implementation takes effect only when the network delivers indication information to indicate that the PDCCH is repeatedly transmitted, or the network side delivers indication information to indicate that the search spaces are associated.

Optionally, the search space group determining rule predefined in the protocol may alternatively be: there is a one-to-one correspondence association relationship between the first K search spaces in the search space set 1 and the first K search spaces in the search space set 2. That is, a search space$^{O1}_k$ is associated with a search space$^{O2}_k$, where a value range of k is [1, K], and K is a minimum value of $N_2$ and $N_3$.

Optionally, the search space group determining rule predefined in the protocol may further be: there is a one-to-one correspondence association relationship between the last K search spaces in the search space set 1 and the last K search spaces in the search space set 2.

Optionally, the search space group determining rule predefined in the protocol may further be: there is a one-to-one correspondence association relationship between specified K search spaces in the search space set 1 and specified K search spaces in the search space set 2.

Optionally, in this embodiment, the determined search space set 1 and the determined search space set 2 may alternatively be distinguished based on different aggregation levels, that is, the plurality of associated search spaces may further be determined based on the aggregation level. It is assumed that the search space set 1 includes a plurality of aggregation levels, and the search space set 2 includes a plurality of aggregation levels. The search spaces having the one-to-one correspondence association relationship may be search spaces that are from two search space sets and that have a same aggregation level. For example, that the terminal determines the plurality of associated search spaces based on a control resource set and an SS set $O_1$ and an SS set $O_2$ that are associated with the control resource set includes: the terminal determines a search space set 1 based on the SS set $O_1$ and the control resource set, where search spaces with an aggregation level of L are {search space $L^{O1}_1$, search space $L^{O1}_2$, ..., and search space $L^{O1}_{N4}$}, and N4 is less than or equal to N2; and the terminal determines a search space set 2 based on the SS set $O_2$ and the control resource set, where search spaces with an aggregation level of L are {search space $L^{O2}_1$, search space $L^{O2}_2$, ..., and search space $L^{O2}_{N5}$}, and N5 is less than or equal to N3. N4 may be equal to or not equal to N5. Optionally, the search space group determining rule predefined in the protocol may alternatively be: a search space $L^{O1}_k$ is associated with a search space $L^{O2}_k$, where a value range of k is [1, K], K is a minimum value of $N_4$ and $N_5$, L represents an aggregation level of a search space, and L=1, 2, 4, 8, 16 ...

In another possible implementation, it is assumed that three source search space sets are associated with one control resource set. Then a similar implementation may be used to determine that every three search spaces are associated.

Based on the above, it can be understood that, in the second implementation, a plurality of search spaces in one search space group come from different search space sets (for example, the search space set 1 and the search space set 2).

In a third implementation, the plurality of search spaces associated with each other are determined based on configured N source search space sets and M control resource sets separately associated with the N source search space sets. N is greater than or equal to 1, and M is greater than or equal to 1. The terminal determines a search space set based on the N source search space sets and the M control resource sets separately associated with the N source search space sets. In this way, the terminal sorts each search space in the search space set according to a specific rule, to obtain a sorted search space set, and the sorted search space set includes: a search space 1, a search space 2, ..., and a search space $N_6$.

Optionally, the search space group determining rule predefined in the protocol may be: a plurality of search spaces whose offsets between the search spaces are equal to an offset offset value are associated with each other. According to the rule, the terminal determines, from the search space set, a plurality of search spaces associated with each other, for example, the search space 1 is associated with a search space (1+offset value); or the search space 1, a search space (1+offset value), and a search space (1+offset value*2) are associated with each other.

When the terminal sorts the search spaces in the search space set according to a specific rule, the specific rule may be sorting based on one or more of an occupied CCE start position, an identifier ID of a corresponding source search space set, an identifier ID of a corresponding control resource set, and a corresponding aggregation level. The following describes optional sorting manners by using examples.

In a possible implementation, the search spaces in the search space set are sorted in ascending order of CCE start positions occupied by the search spaces.

In another possible implementation, the search spaces in the search space set are sorted in ascending order (or descending order) of identifiers IDs of source search space sets respectively corresponding to the search spaces; then search spaces having a same identifier ID of source search space set are sorted in ascending order (or descending order) of identifiers IDs of control resource sets respectively corresponding to the search spaces; finally, search spaces having a same identifier ID of control resource set are sorted in ascending order (or descending order) of aggregation levels of the search spaces.

In still another possible implementation, the search spaces in the search space set are sorted in ascending order (or descending order) of identifiers IDs of control resource sets respectively corresponding to the search spaces; then search spaces having a same identifier ID of control resource set are sorted in ascending order (or descending order) of identifiers IDs of source search space sets respectively corresponding to the search spaces; finally, search spaces having a same identifier ID of source search space set are sorted in ascending order (or descending order) of aggregation levels of the search spaces.

S102: The terminal determines, based on the first indication information, a quantity of blind detection times corresponding to the first search space set.

In this embodiment, the search space group includes N first search spaces, M second search spaces, and T third search spaces. N is an integer greater than or equal to 1, and M and T are natural numbers. It should be noted that when a value of N is 1, at least one parameter of M and T is not 0.

With reference to the foregoing embodiment, in this embodiment, the N first search spaces, the M second search spaces, and the T third search spaces included in the search space group are from different search space sets (for example, in the second implementation in S101, when the plurality of source search space sets are associated with one control resource set, the plurality of search spaces having an association relationship are from different search space sets). For example, the first search space belongs to the first search space set, the second search space belongs to a second search space set, and the third search space belongs to a third search space set. An index of the first search space set is less than an index of the second search space set, and the index of the first search space set is greater than an index of the third search space set.

This embodiment provides the following blind detection rules.

Blind Detection Rule 1

To simplify a blind detection procedure, this embodiment provides a blind detection rule 1: when the terminal performs blind detection on a first search space set, the terminal may perform independent blind detection on each search space in the first search space set; or the terminal may perform joint blind detection on at least one first search space and at least one second search space in a search space group; or the terminal may perform joint blind detection on at least two first search spaces in a search space group.

Based on the blind detection rule 1, the following describes a method for determining a quantity of blind detection times provided in an embodiment.

If N is greater than or equal to 2, when performing blind detection on the first search space set, the terminal may select any n first search spaces from the search space group to perform joint blind detection. n is an integer, and $2 \leq n \leq N$. In this case, for one search space group, a total quantity of times that the terminal needs to perform joint blind detection is $\Sigma_{n=2}^{N} C_N^n$.

If M is an integer greater than or equal to 1, when performing blind detection on the first search space set, the terminal may alternatively select n first search spaces from the N first search spaces included in the search space group, and select m second search spaces from the M second search spaces; then the terminal performs joint blind detection on the n first search spaces and the m second search spaces. n and m are integers, 1≤n≤N, and 1≤m≤M. It may be understood that, when the terminal selects the n first search spaces from the N first search spaces, there are a total of $\Sigma_{n=1}^{N} C_N^n$ combinations; when the terminal selects the m second search spaces from the M second search spaces, there are a total of $\Sigma_{m=1}^{M} C_M^m$ combinations. Therefore, for one search space group, a total quantity of times that the terminal needs to perform joint blind detection is $(\Sigma_{n=1}^{N} C_N^n) \times (\Sigma_{m=1}^{M} C_M^m)$, that is, $(2^N - 1) \times (2^M - 1)$.

In addition, when performing blind detection on the first search space set, the terminal further needs to perform independent blind detection on each first search space in the first search space set. It is assumed that the first search space set includes $\Sigma_L M_{S_{uss}}^{(L)}$ search spaces. A quantity of times that the terminal needs to perform blind detection is $\Sigma_L M_{S_{uss}}^{(L)}$. It should be noted that, in this embodiment, one search space is equivalent to one candidate PDCCH. Therefore, the first search space set includes $\Sigma_L M_{S_{uss}}^{(L)}$ search spaces, that is, the first search space set includes $\Sigma_L M_{S_{uss}}^{(L)}$ candidate PDCCHs. It may be understood that, $\Sigma_L M_{S_{uss}}^{(L)}$ is a quantity of search spaces included in the first search space set, and is also a quantity of candidate PDCCHs included in the first search space set. A general description is provided herein, and details are not described below.

It should be noted that, in $\Sigma_L M_{S_{uss}}^{(L)}$, L represents an aggregation level, and L=1, 2, 4, 8, 16, . . . . $M_{S_{uss}}^{(L)}$ represents a quantity of search spaces (or candidate PDCCHs) whose aggregation level is L in the first search space set.

It should be noted that the quantity of search spaces included in the first search space set may be determined based on higher layer signaling. For a specific implementation, refer to a current technology. Details are not described herein again.

Based on the above, when the first search space set corresponds to K search space groups, the quantity of blind detection times corresponding to the first search space set may meet the following formula (1):

$$Q = \sum_L M_{S_{uss}}^{(L)} + \sum_{k=1}^{K} [(2^{N_k} - 1) \times (2^{M_k} - 1) + (2^{N_k} - N_k - 1)] \quad (1)$$

Q is a quantity of blind detection times corresponding to the first search space set, $N_k$ is a quantity of first search spaces included in a $k^{th}$ search space group, and $M_k$ is a quantity of second search spaces included in the $k^{th}$ search space group, where k is an integer greater than or equal to 1 and less than or equal to K, and K is an integer greater than or equal to 1.

The formula (1) may be simplified into the following formula (2):

$$Q = \sum_L M_{S_{uss}}^{(L)} + \sum_{k=1}^{K} [(2^{N_k} - 1) \times 2^{M_k} - N_k] \quad (2)$$

It should be noted that, the search space groups are numbered starting from 1. Therefore, k in the formula (1) or (2) is an integer greater than or equal to 1 and less than or equal to K. In other following formulas, the search space groups are also numbered starting from 1. A general description is provided herein, and details are not described below. It may be understood that, when the search space groups are numbered starting from another number, a related formula (for example, the formula (1) or the formula (2)) needs to be correspondingly modified, and a formula obtained after the modification also falls within the protection scope of this embodiment.

That is, the quantity of blind detection times corresponding to the first search space set is determined based on the quantity of search spaces included in the first search space set, a quantity of first search spaces included in each search space group in the at least one search space group corresponding to the first search space set, and a quantity of second search spaces included in each search space group in the at least one search space group corresponding to the first search space set.

It may be understood that, the first indication information specifically indicates search space groups specifically corresponding to the first search space set and search spaces specifically included in each search space group. Therefore, for at least one search space group corresponding to the first search space set, the quantity of first search spaces included in each search space group and the quantity of second search spaces are determined based on the first indication information.

The following describes the formula (1) with reference to a specific example.

Figure 4:
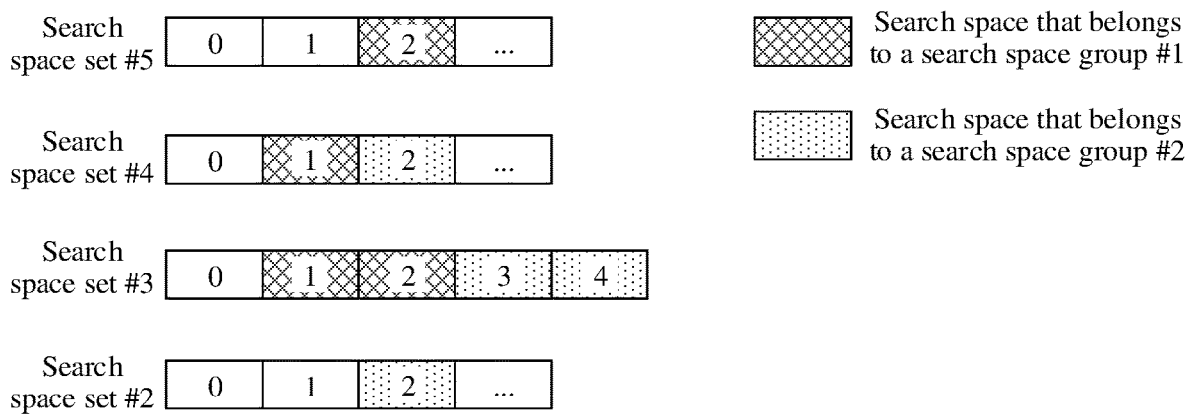
FIG. 4 is a schematic diagram a of search space set and search space group according to the embodiments.

As shown in FIG. 4, a block in FIG. 4 represents a search space, and a number in the block represents an index of the search space corresponding to the block. A general description is provided herein, and details are not described below. Descriptions are provided with reference to FIG. 4 by using an example. A search space set #3 is used as a first search space set, and the search space set #3 includes five search spaces, which are respectively $SS_{(3,0)} \sim SS_{(3,4)}$. The search space set #3 corresponds to two search space groups, where a search space group #1 includes the following search spaces: $SS_{(3,1)}$, $SS_{(3,2)}$, $SS_{(4,1)}$, and $SS_{(5,2)}$; and a search space group #2 includes the following search spaces: $SS_{(3,3)}$, $SS_{(3,4)}$, $SS_{(4,2)}$, and $SS_{(2,2)}$.

Descriptions are provided below with reference to FIG. 5 to FIG. 18. According to the blind detection rule 1, when performing blind detection on the first search space, the terminal needs to perform joint blind detection. In FIG. 5 to FIG. 18, a plurality of blocks connected by using bidirectional arrows represent a plurality of search spaces on which the terminal needs to perform joint blind detection.

Figure 5:
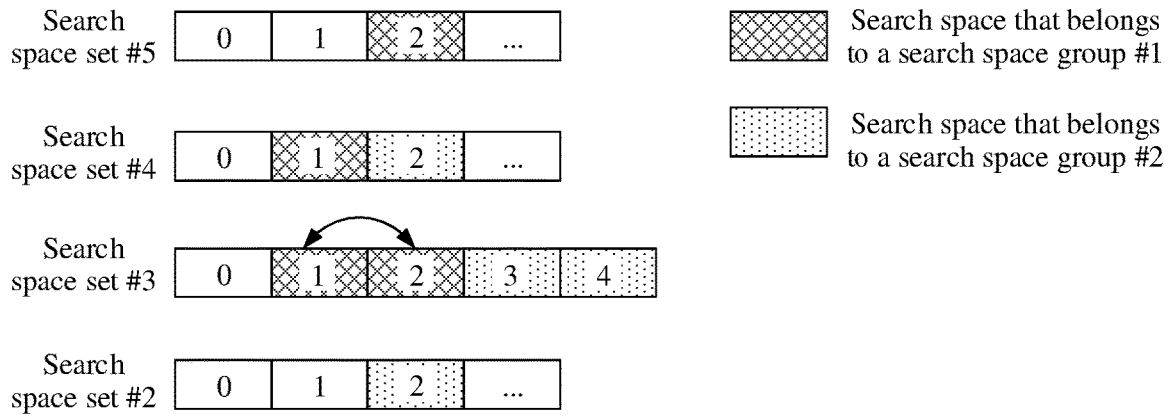
FIG. 5 is a schematic diagram a of search space set and search space group according to the embodiments.
Figure 6:
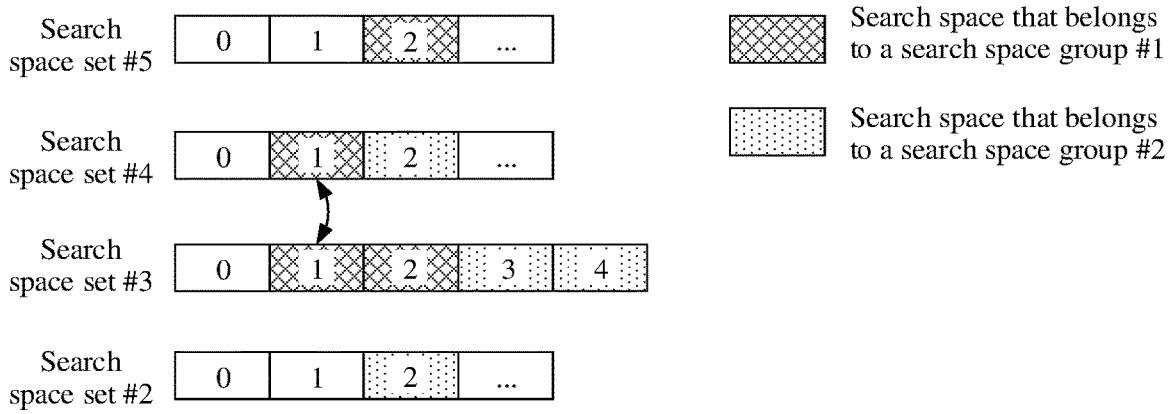
FIG. 6 is a schematic diagram a of search space set and search space group according to the embodiments.
Figure 7:
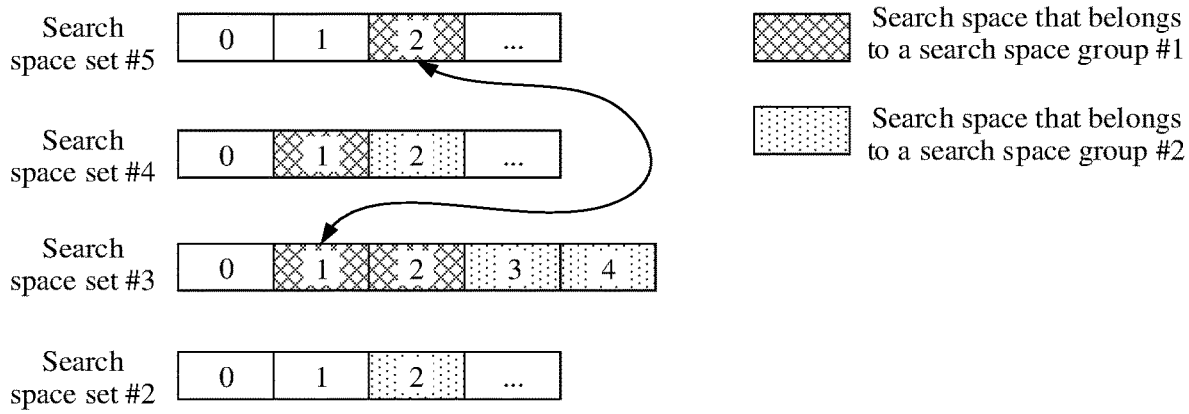
FIG. 7 is a schematic diagram a of search space set and search space group according to the embodiments.
Figure 8:
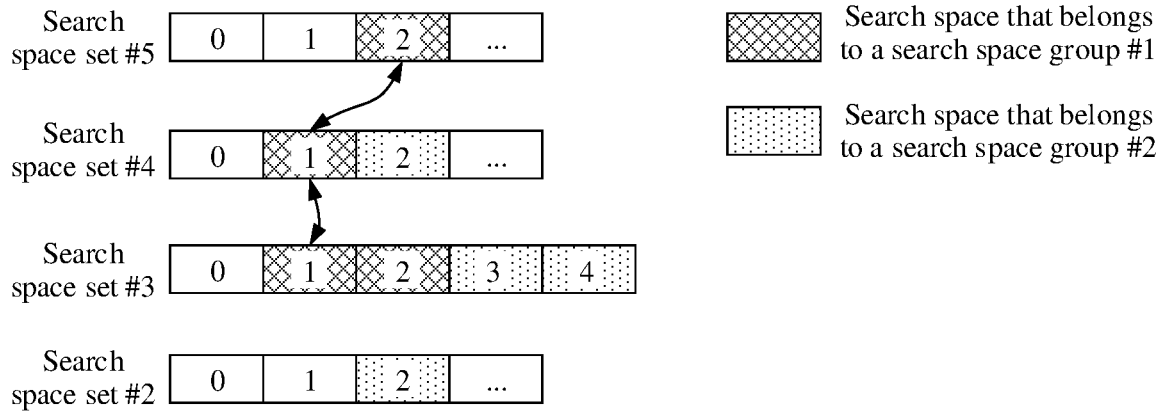
FIG. 8 is a schematic diagram a of search space set and search space group according to the embodiments.
Figure 9:
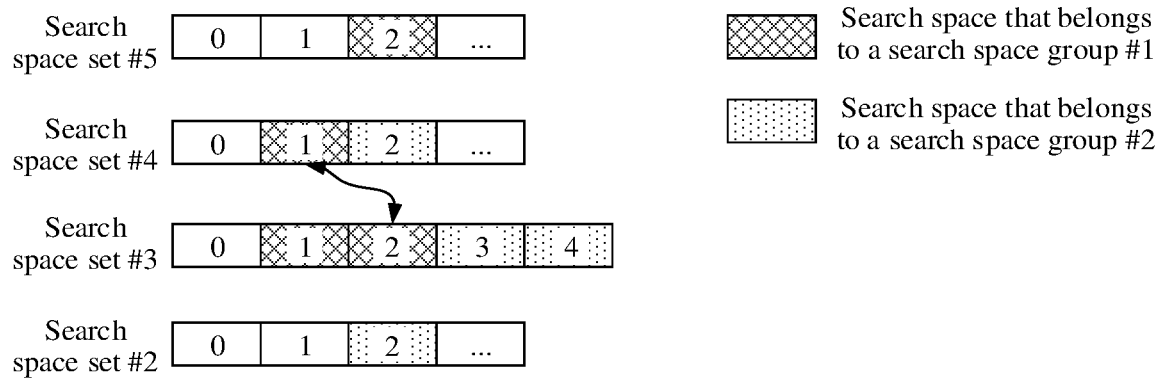
FIG. 9 is a schematic diagram a of search space set and search space group according to the embodiments.
Figure 10:
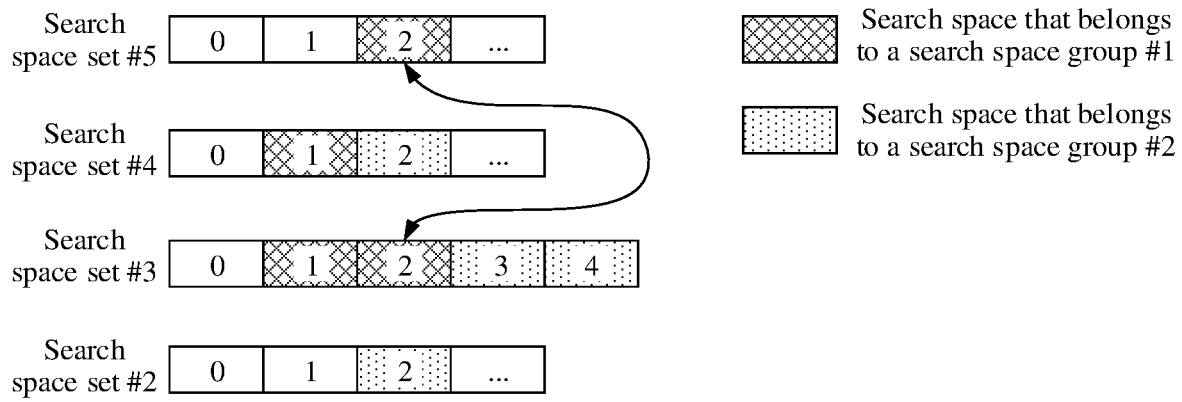
FIG. 10 is a schematic diagram a of search space set and search space group according to the embodiments.
Figure 11:
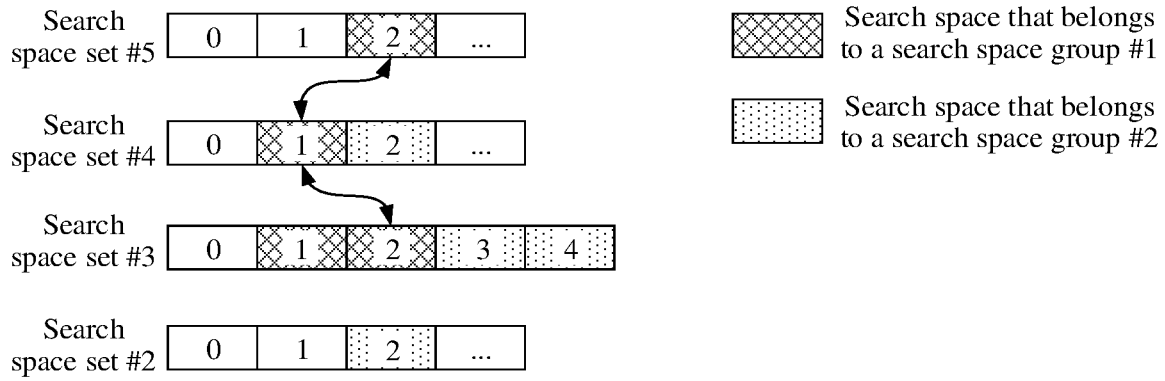
FIG. 11 is a schematic diagram a of search space set and search space group according to the embodiments.
Figure 12:
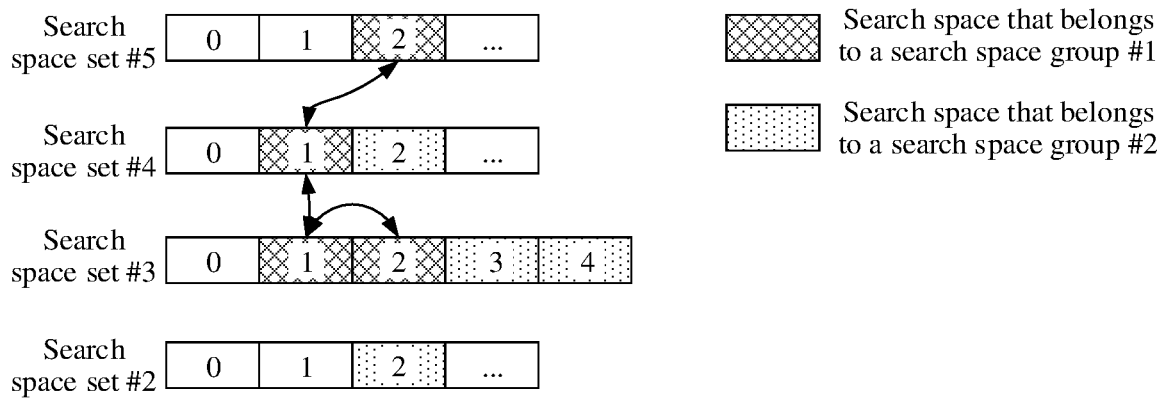
FIG. 12 is a schematic diagram a of search space set and search space group according to the embodiments.
Figure 13:
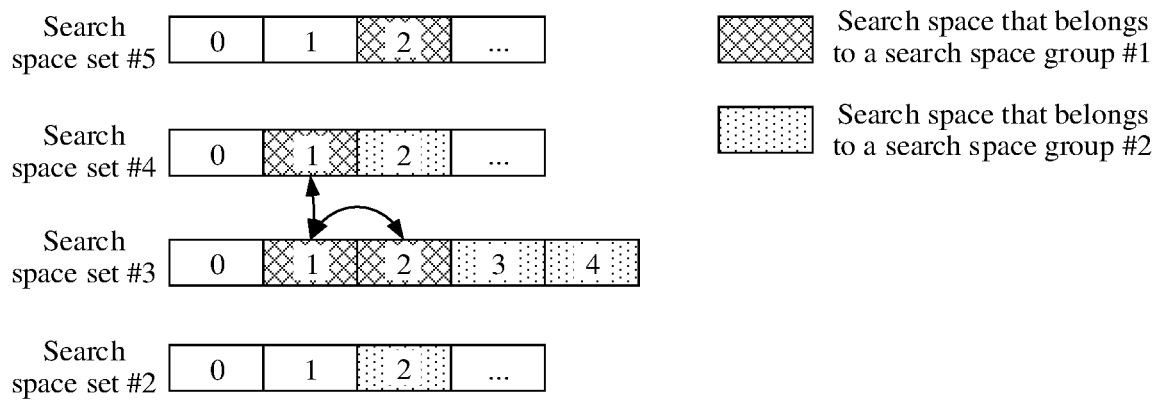
FIG. 13 is a schematic diagram a of search space set and search space group according to the embodiments.
Figure 14:
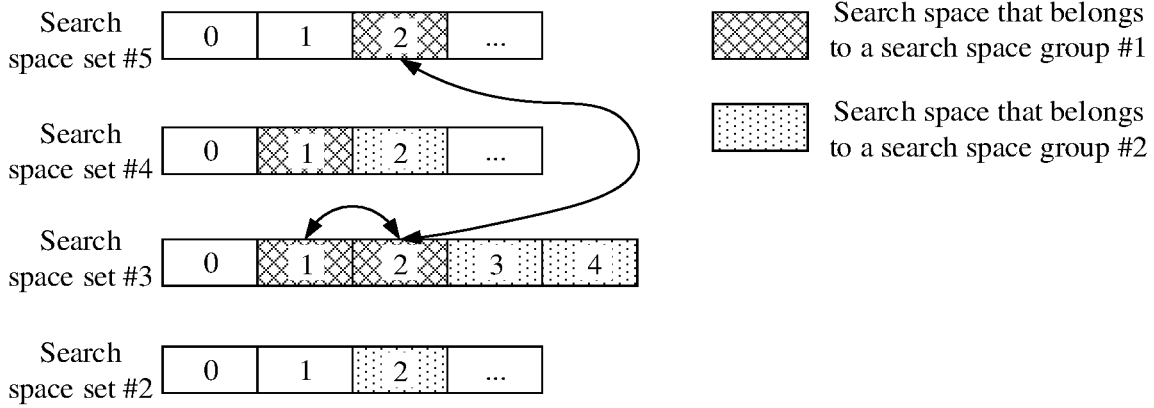
FIG. 14 is a schematic diagram a of search space set and search space group according to embodiments.

For the search space group #1, when the terminal performs blind detection on the search space set #3, as shown in FIG. 5, jointly blind detection is performed once on $SS_{(3,1)}$ and $SS_{(3,2)}$; as shown in FIG. 6, jointly blind detection is performed once on $SS_{(3,1)}$ and $SS_{(4,1)}$; as shown in FIG. 7, jointly blind detection is performed once on $SS_{(3,1)}$ and $SS_{(5,2)}$; as shown in FIG. 8, jointly blind detection is performed once on $SS_{(3,1)}$, $SS_{(4,1)}$, and $SS_{(5,2)}$; as shown in FIG. 9, jointly blind detection is performed once on $SS_{(3,2)}$ and $SS_{(4,1)}$; as shown in FIG. 10, jointly blind detection is performed once on $SS_{(3,2)}$ and $SS_{(5,2)}$; as shown in FIG. 11, jointly blind detection is performed once on $SS_{(3,2)}$, $SS_{(4,1)}$, and $SS_{(5,2)}$; as shown in FIG. 12, jointly blind detection is performed once on $SS_{(3,1)}$, $SS_{(3,2)}$, $SS_{(4,1)}$, and $SS_{(5,2)}$; as shown in FIG. 13, jointly blind detection is performed once on $SS_{(3,1)}$, $SS_{(3,2)}$, and $SS_{(4,1)}$; as shown in FIG. 14, jointly blind detection is performed once on $SS_{(3,1)}$, $SS_{(3,2)}$, and $SS_{(5,2)}$. Based on the above, for the search space group #1, a total quantity of times that the terminal needs to perform joint blind detection is 10.

Figure 15:
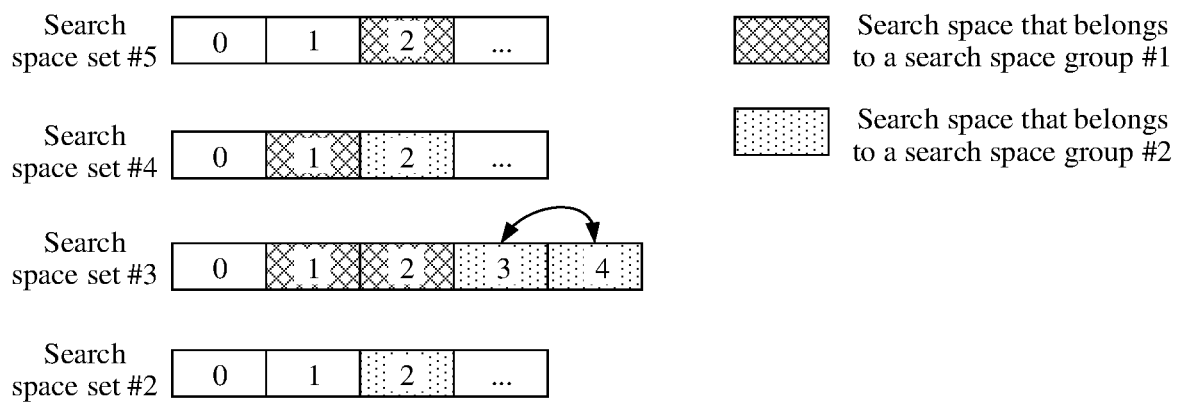
FIG. 15 is a schematic diagram a of search space set and search space group according to the embodiments.
Figure 16:
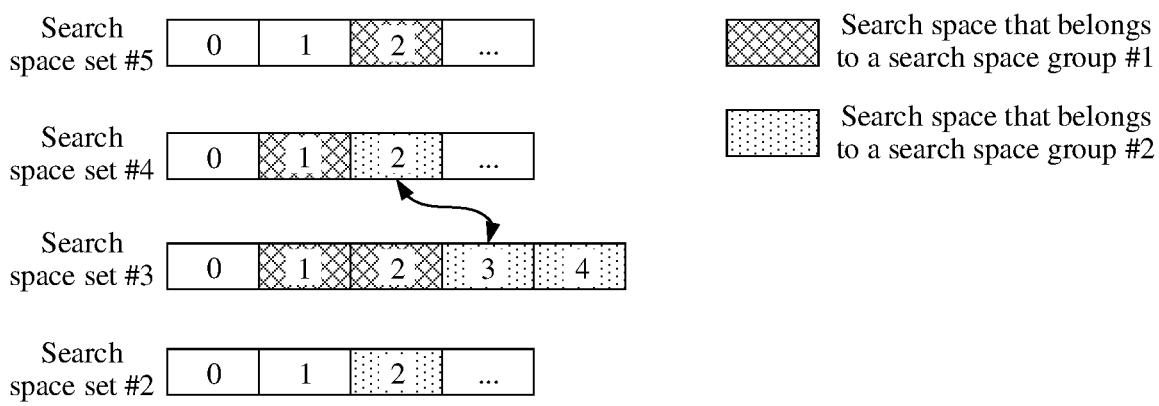
FIG. 16 is a schematic diagram a of search space set and search space group according to the embodiments.
Figure 17:
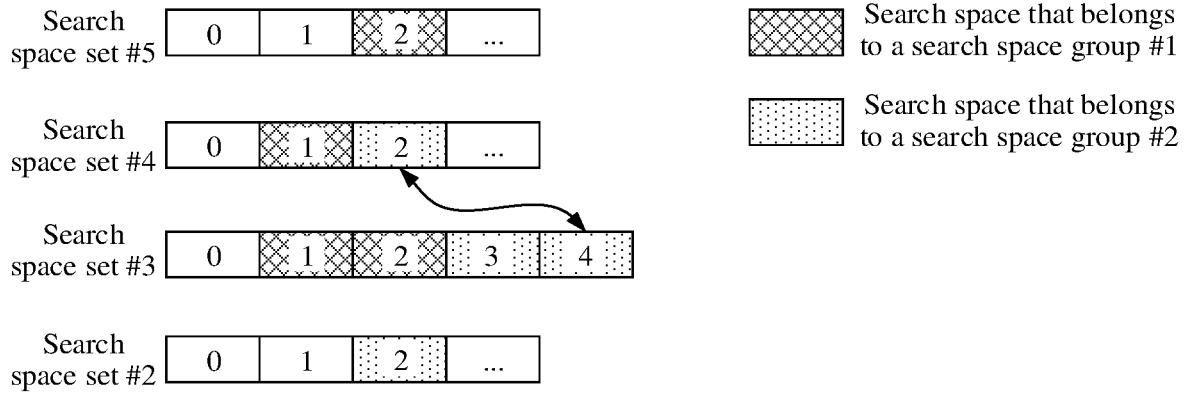
FIG. 17 is a schematic diagram a of search space set and search space group according to the embodiments.
Figure 18:
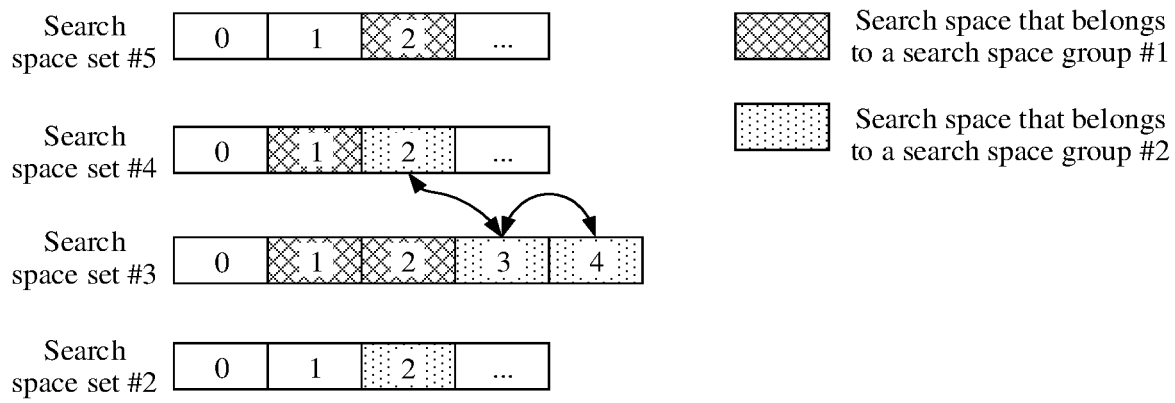
FIG. 18 is a schematic diagram a of search space set and search space group according to the embodiments.

For the search space group #2, when the terminal performs blind detection on the search space set #3, as shown in FIG. 15, jointly blind detection is performed once on $SS_{(3,3)}$ and $SS_{(3,4)}$; as shown in FIG. 16, jointly blind detection is performed once on $SS_{(3,3)}$ and $SS_{(4,2)}$; as shown in FIG. 17, jointly blind detection is performed once on $SS_{(3,4)}$ and $SS_{(4,2)}$; as shown in FIG. 18, jointly blind detection is performed once on $SS_{(3,3)}$, $SS_{(3,4)}$, and $SS_{(4,2)}$. Based on the above, for the search space group #2, a total quantity of times that the terminal needs to perform joint blind detection is 4.

In addition, independent blind detection needs to be performed once on five search spaces included in the search space set #3.

Therefore, a quantity of blind detection times corresponding to the search space set #3 is: 5+10+4=19.

Alternatively, the terminal may calculate, by using the formula (1), the quantity of blind detection times corresponding to the search space set #3. In the search space group #1, a quantity of first search spaces is 2, and a quantity of second search spaces is 2; in the search space group #2, a quantity of first search space groups is 2, and a quantity of second search space groups is 1. Therefore, the foregoing data is substituted into the formula (1) to obtain:

$$Q=5+[(2^2-1)\times(2^2-1)+(2^2-2-1)]+[(2^2-1)\times(2-1)+(2^2-2-1)]$$

In this way, the terminal may also determine that the quantity of blind detection times corresponding to the search space set #3 is 19.

In an implementation, in the solution, search spaces included in the search space group may be limited to belong to a same search space set, to reduce complexity of blind detection.

When the search space group is limited to include only search spaces in a same search space set, the foregoing formula (1) may be deformed into the following formula (3):

$$Q = \sum_L M_{S_{uss}}^{(L)} + \sum_{k=1}^{K} (2^{N_k} - N_k - 1) \qquad (3)$$

That is, the quantity of blind detection times corresponding to the first search space set is determined based on the quantity of search spaces included in the first search space set, and the quantity of first search spaces included in each search space group in the at least one search space group corresponding to the first search space set.

In another implementation, the solution may alternatively limit a quantity of search spaces included in the search space group, to reduce complexity of blind detection. The following uses an example in which the quantity of search spaces included in the search space group is equal to two for description.

It may be understood that, when the quantity of search spaces included in the search space group is equal to two, there may be the following several cases for the search space group:

Case 1: The search space group includes two first search spaces;

Case 2: The search space group includes one first search space and one second search space; and Case 3: The search space group includes one first search space and one third search space.

For ease of description, in the following description, the search space group in case 1 is referred to as a first search space group for short, the search space group in case 2 is referred to as the second search space group for short, and the search space group in case 3 is referred to as a third search space group for short. A general description is provided herein, and details are not described below.

It should be noted that, the quantity of first search space groups, the quantity of second search space groups, and a quantity of third search space groups may be determined based on the first indication information. Descriptions are uniformly provided herein, and details are not described below again.

According to the blind detection rule 1, when performing blind detection on the first search space set, the terminal needs to perform the following blind detections:

(1) The terminal performs joint blind detection on the two first search spaces in the first search space group. In other words, joint blind detection is performed once on the two first search spaces in the first search space group.

(2) The terminal performs joint blind detection on the first search space and the second search space in the second search space group. In other words, joint blind detection is performed once on the first search space and the second search space in the second search space group.

(3) The terminal separately performs independent blind detection on each first search space in the first search space set. In other words, independent blind detection is performed once on each first search space included in the first search space set.

It is assumed that the first search space set includes $\Sigma_L M_{S_{uss}}^{(L)}$ search spaces, the first search space set corresponds to K search space groups, and there are P first search space groups, L second search space groups, and R third search space groups in the K search space groups. K=P+L+R, K is a positive integer, and P, L, and R are natural numbers.

For (1), a total quantity of times that the terminal needs to perform joint blind detection is P; for (2), a total quantity of times that the terminal needs to perform joint blind detection is L; and for (3), the total quantity of times that the terminal needs to perform independent blind detection is $\Sigma_L M_{S_{uss}(j)}^{(L)}$.

Therefore, the quantity of blind detection times corresponding to the first search space set may meet the following formula (4):

$$Q = \sum_L M_{S_{uss}}^{(L)} + P + L \qquad (4)$$

It may be understood that, the formula (4) is a deformation of the formula (1), and is applicable to a scenario in which the quantity of search spaces included in the search space group is equal to two.

It can be understood from the formula (4) that the quantity of blind detection times corresponding to the first search space set is determined based on the quantity of search spaces included in the first search space set, the quantity of first search space groups, and the quantity of second search space groups.

Further, when the search space group is limited to include only search spaces of a same search space set, all search space groups corresponding to the first search space set are first search space groups. In this case, the formula (4) may be deformed into the following formula (5):

$$Q = \sum_L M_{S_{uss}}^{(L)} + P \qquad (5)$$

It can be understood from the formula (5) that the quantity of blind detection times corresponding to the first search space group is determined based on the quantity of search spaces included in the first search space set and the quantity of first search space groups.

Blind Detection Rule 2

To simplify a blind detection procedure, this embodiment further provides a blind detection rule 2: when the terminal performs blind detection on a first search space set, the terminal may perform independent blind detection on each search space in the first search space set; or the terminal may perform joint blind detection on at least one first search space and at least one third search space in a search space group; or the terminal may perform joint blind detection on at least two first search spaces in the search space group.

Based on the blind detection rule 2, the following describes a method for determining a quantity of blind detection times provided in an embodiment.

If N is greater than or equal to 2, when performing blind detection on the first search space set, the terminal may select any n first search spaces from the search space group to perform joint blind detection. n is an integer, and $2 \leq n \leq N$. In this case, a total quantity of times that the terminal needs to perform joint blind detection is $\Sigma_{n=2}^{N} C_N^n$, that is, $2^N - N - 1$.

If T is an integer greater than or equal to 1, when performing blind detection on the first search space set, the terminal may alternatively select n first search spaces from the N first search spaces included in the search space group, and select t third search spaces from the T third search spaces; then the terminal performs joint blind detection on then first search spaces and the t third search spaces. a and t are integers, $1 \leq n \leq N$, and $1 \leq t \leq T$. It may be understood that, when the terminal selects the n first search spaces from the N first search spaces, there are a total of $\Sigma_{n=1}^{N} C_N^n$ combinations; when the terminal selects the t second search spaces from the T third search spaces, there are a total of $\Sigma_{t=1}^{T} C_T^t$ combinations. Therefore, a total quantity of times that the terminal needs to perform joint blind detection is $(\Sigma_{n=1}^{N} C_N^n) \times (\Sigma_{t=1}^{T} C_T^t)$, that is, $(2^N - 1) \times (2^T - 1)$.

In addition, when performing blind detection on the first search space set, the terminal further needs to perform independent blind detection on each first search space in the first search space set. It is assumed that the first search space set includes $\Sigma_L M_{S_{uss}(j)}^{(L)}$ search spaces. A quantity of times that the terminal needs to perform blind detection is $\Sigma_L M_{S_{uss}(j)}^{(L)}$.

Based on the above, when the first search space set corresponds to K search space groups, the quantity of blind detection times corresponding to the first search space set may meet the following formula (6):

$$Q = \sum_L M_{S_{uss}}^{(L)} + \sum_{k=1}^{K} [(2^{N_k} - 1) \times (2^{T_k} - 1) + (2^{N_k} - N_k - 1)] \quad (6)$$

Q is a quantity of blind detection times corresponding to the first search space set, $N_k$ is a quantity of first search spaces included in a $k^{th}$ search space group, and $T_k$ is a quantity of second search spaces included in the $k^{th}$ search space group, where k is an integer greater than or equal to 1 and less than or equal to K, and K is an integer greater than or equal to 1.

That is, the quantity of blind detection times corresponding to the first search space set is determined based on the quantity of search spaces included in the first search space set, the quantity of first search spaces included in each search space group in the at least one search space group corresponding to the first search space set, and a quantity of third search spaces included in each search space group in the at least one search space group corresponding to the first search space set.

It may be understood that, for at least one search space group corresponding to the first search space set, the quantity of first search spaces included in each search space group and the quantity of third search spaces included in each search space group are determined based on the first indication information.

The following describes the formula (6) with reference to a specific example.

Figure 19:
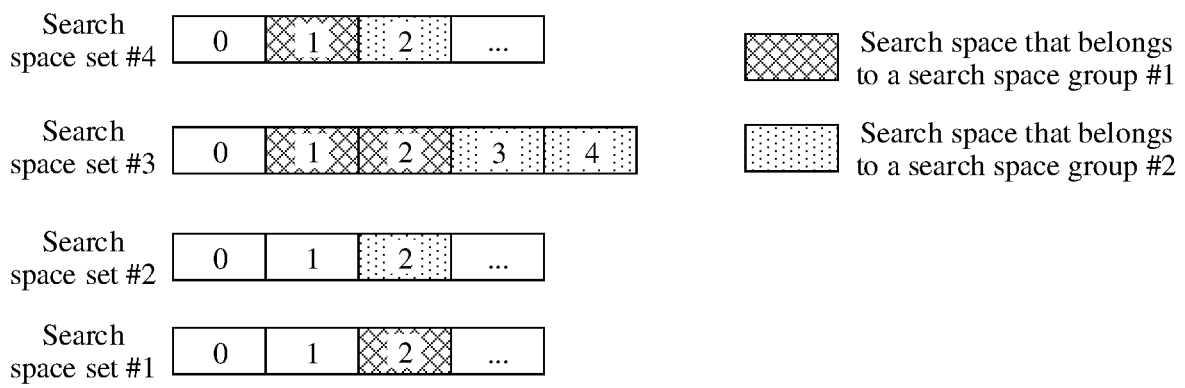
FIG. 19 is a schematic diagram a of search space set and search space group according to the embodiments.

As shown in FIG. 19, a search space set #3 is used as the first search space set, and the search space set #3 includes five search spaces, which are respectively $SS_{(3,0)} \sim SS_{(3,4)}$. The search space set #3 corresponds to two search space groups, where a search space group #1 includes the following search spaces: $SS_{(3,1)}$, $SS_{(3,2)}$, $SS_{(4,1)}$, and $SS_{(1,2)}$; and a search space group #2 includes the following search spaces: $SS_{(3,3)}$, $SS_{(3,4)}$, $SS_{(4,2)}$, and $SS_{(2,2)}$.

Descriptions are provided below with reference to FIG. 20 to FIG. 27. According to the blind detection rule 2, when performing blind detection on the search space set #3, the terminal needs to perform joint blind detection.

Figure 20:
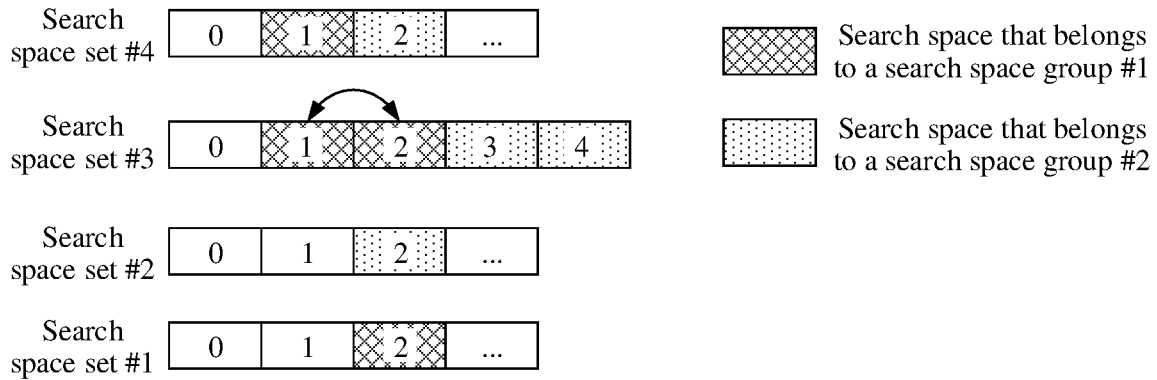
FIG. 20 is a schematic diagram a of search space set and search space group according to the embodiments.
Figure 21:
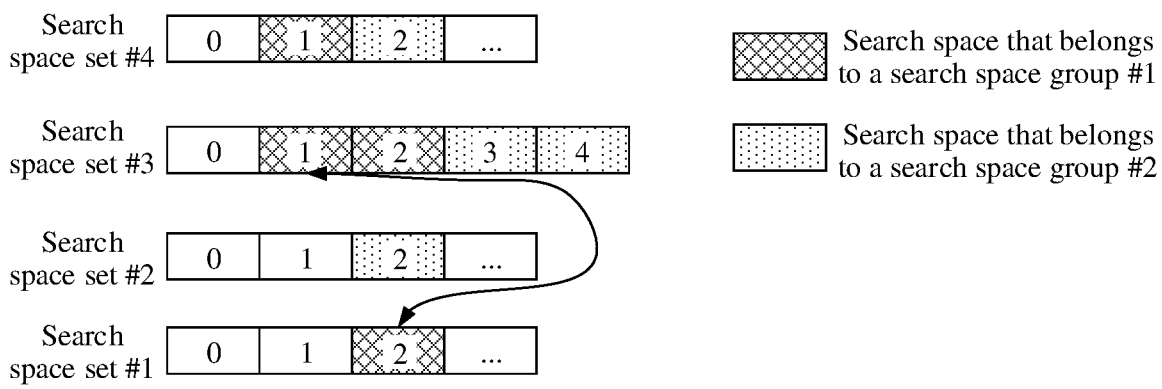
FIG. 21 is a schematic diagram a of search space set and search space group according to the embodiments.
Figure 22:
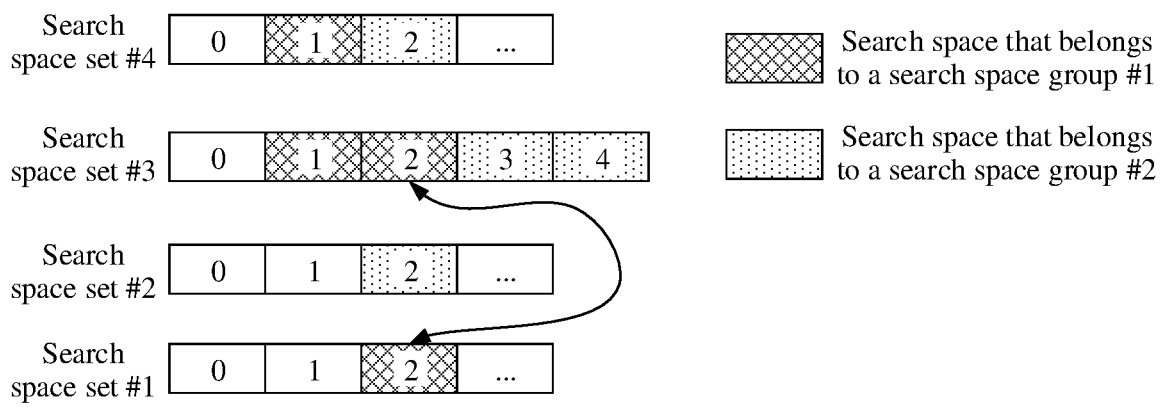
FIG. 22 is a schematic diagram a of search space set and search space group according to the embodiments.
Figure 23:
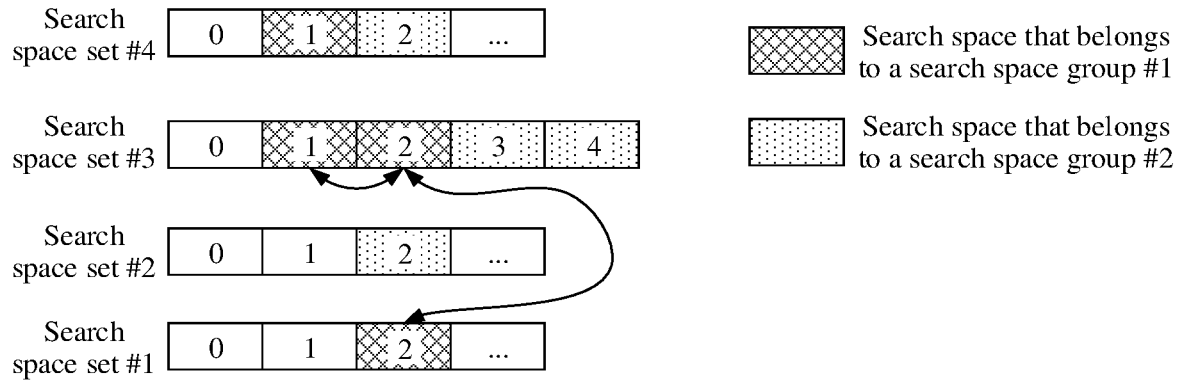
FIG. 23 is a schematic diagram a of search space set and search space group according to the embodiments.

For the search space group #1, when the terminal performs blind detection on the search space set #3, as shown in FIG. 20, jointly blind detection is performed once on $SS_{(3,1)}$ and $SS_{(3,2)}$; as shown in FIG. 21, jointly blind detection is performed once on $SS_{(3,1)}$ and $SS_{(1,2)}$; as shown in FIG. 22, jointly blind detection is performed once on $SS_{(3,2)}$ and $SS_{(1,2)}$; as shown in FIG. 23, jointly blind detection is performed once on $SS_{(3,1)}$, $SS_{(3,2)}$, and $SS_{(1,2)}$. Based on the above, for the search space group #1, a total quantity of times that the terminal performs joint blind detection is 4.

Figure 24:
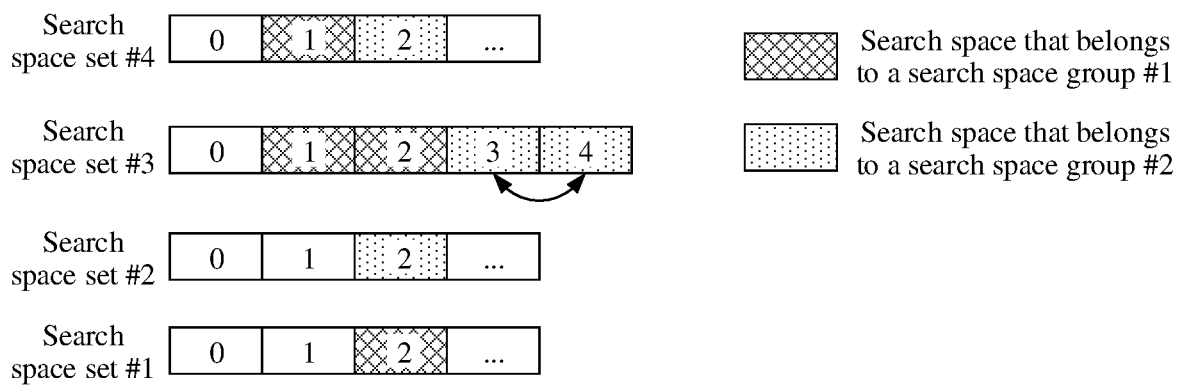
FIG. 24 is a schematic diagram a of search space set and search space group according to the embodiments.
Figure 25:
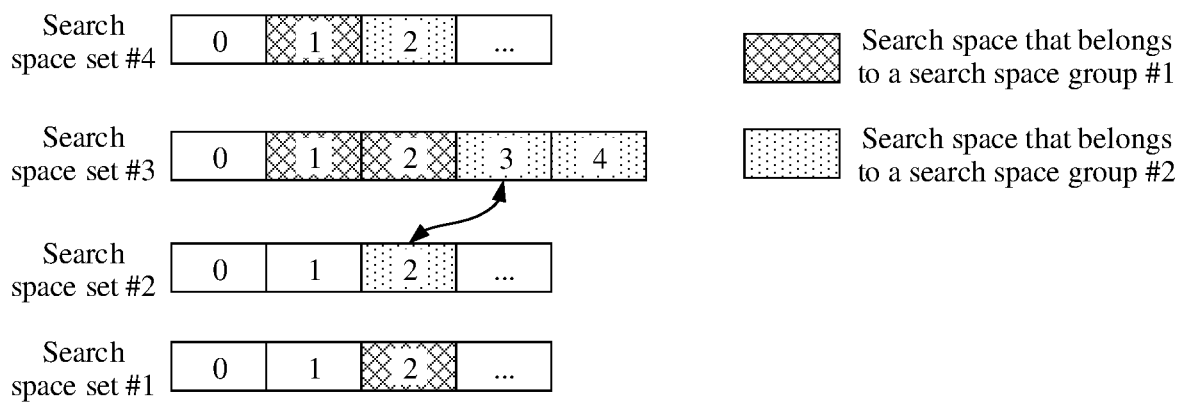
FIG. 25 is a schematic diagram a of search space set and search space group according to the embodiments.
Figure 26:
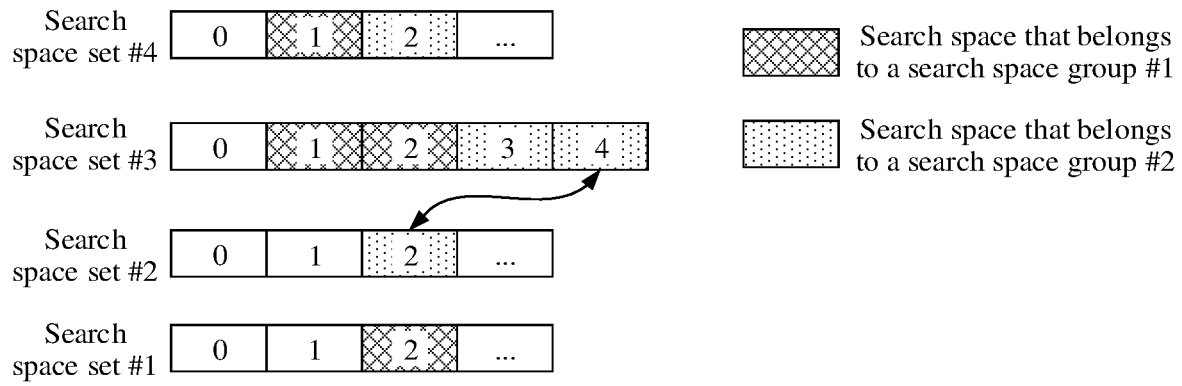
FIG. 26 is a schematic diagram a of search space set and search space group according to the embodiments.
Figure 27:
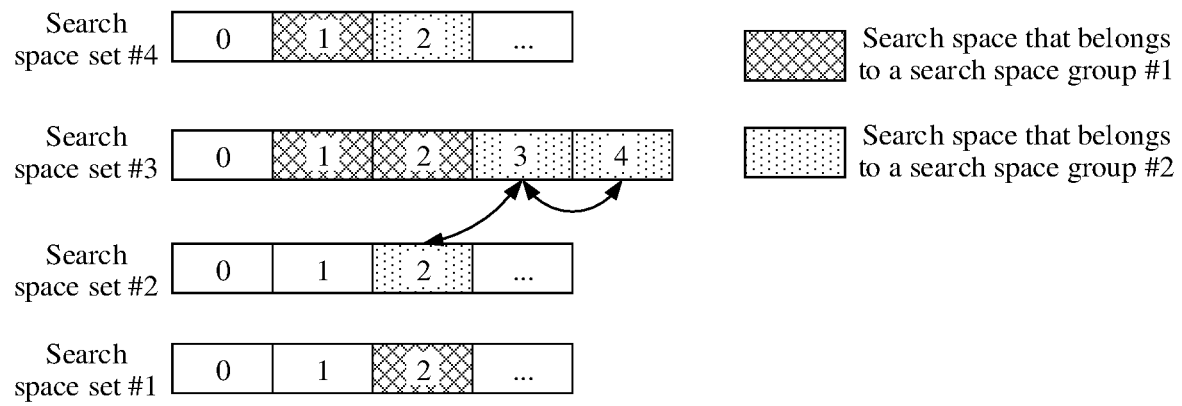
FIG. 27 is a schematic diagram a of search space set and search space group according to the embodiments.

For the search space group #2, when the terminal performs blind detection on the search space set #3, as shown in FIG. 24, jointly blind detection is performed once on $SS_{(3,3)}$ and $SS_{(3,4)}$; as shown in FIG. 25, jointly blind detection is performed once on $SS_{(3,3)}$ and $SS_{(2,2)}$; as shown in FIG. 26, jointly blind detection is performed once on $SS_{(3,4)}$ and $SS_{(2,2)}$; as shown in FIG. 27, jointly blind detection is performed once on $SS_{(3,3)}$, $SS_{(3,4)}$, and $SS_{(2,2)}$. Based on the above, for the search space group #2, a total quantity of times that the terminal performs joint blind detection is 4.

In addition, independent blind detection is performed once on five search spaces included in the search space set #3.

Therefore, a quantity of blind detection times corresponding to the search space set #3 is: 5+4+4=13.

Alternatively, the terminal may calculate, by using the formula (3), the quantity of blind detection times corresponding to the search space set #3. In the search space group #1, a quantity of first search spaces is 2, and a quantity of second search spaces is 1; in the search space group #2, a quantity of first search space groups is 2, and a quantity of second search space groups is 1. Therefore, the foregoing data is substituted into the formula (6) to obtain:

$Q=5+[(2^2-1)\times(2-1)+(2^2-2-1)]+[(2^2-1)\times(2^2-2-1)]$

In this way, the terminal may also determine that the quantity of blind detection times corresponding to the search space set #3 is 13.

In an implementation, in the solution, search spaces included in the search space group may be limited to belong to a same search space set, to reduce complexity of blind detection.

When the search space group is limited to include only search spaces in a same search space set, the foregoing formula (6) may be deformed into the foregoing formula (3). In this case, the blind detection rule 1 is the same as the blind detection rule 2, that is: when the terminal performs blind detection on a first search space set, the terminal may perform independent blind detection on each search space in the first search space set, or the terminal may perform joint blind detection on at least two first search spaces in the search space group.

In another implementation, the solution may alternatively limit a quantity of search spaces included in the search space group, to reduce complexity of blind detection.

The following uses an example in which the quantity of search spaces included in the search space group is equal to two for description.

According to the blind detection rule 2, when performing blind detection on the first search space set, the terminal performs the following blind detections:

(1) The terminal performs joint blind detection on the two first search spaces in the first search space group. In other words, joint blind detection is performed once on the two first search spaces in the first search space group.

(2) The terminal performs joint blind detection on the first search space and the third search space in the third search space group. In other words, joint blind detection is performed once on the first search space and the third search space in the third search space group.

(3) The terminal separately performs independent blind detection on each first search space in the first search space set. In other words, independent blind detection is performed once on each first search space included in the first search space set.

It is assumed that the first search space set includes $\Sigma_L M_{S_{uss}}^{(L)}$ search spaces, the first search space set corresponds to K search space groups, and there are P first search space groups, L second search space groups, and R third search space groups in the K search space groups. K=P+L+R, K is a positive integer, and P, L, and R are natural numbers.

For (1), a total quantity of times that the terminal performs joint blind detection is P; for (2), a total quantity of times that the terminal performs joint blind detection is R; and for (3), the total quantity of times that the terminal performs independent blind detection is $\Sigma_L M_{S_{uss}}^{(L)}$. Therefore, the quantity of blind detection times corresponding to the first search space set may meet the following formula (7):

$$Q = \sum_L M_{S_{uss}}^{(L)} + P + R \quad (7)$$

It may be understood that, the formula (7) is a deformation of the formula (6), and is applicable to a scenario in which the quantity of search spaces included in the search space group is equal to two.

It can be understood from the formula (7) that the quantity of blind detection times corresponding to the first search space set is determined based on the quantity of search spaces included in the first search space set, the quantity of first search space groups, and the quantity of third search space groups.

Further, when the search space group is limited to include only search spaces of a same search space set, all search space groups corresponding to the first search space set are first search space groups. In this case, the formula (7) may be deformed into the formula (5). For the formula (5), refer to the foregoing description. Details are not described herein again.

Blind Detection Rule 3

To simplify a blind detection procedure of the terminal, this embodiment provides a DCI sending method 1: when a search space whose sorting sequence number is x in a search space group carries DCI of the terminal, search spaces whose sorting sequence numbers are greater than x in the search space group all carry the DCI carried by the search space whose sorting sequence number is x. x is an integer greater than or equal to 0 and less than or equal to X−1. The search space group includes X search spaces, and X is an integer greater than 1.

It should be noted that a sorting sequence number of a search space in the search space group is determined according to a preset rule. Optionally, the preset rule is: sorting search spaces in the search space group in ascending order of set indexes; and for a plurality of search spaces having a same set index, sorting the plurality of search spaces in ascending order of indexes, and finally determining a sorting sequence number of each search space in the search space group.

For example, the search space group includes six search spaces, which are respectively $SS_{(3,3)}$, $SS_{(3,4)}$, $SS_{(4,2)}$, $SS_{(2,2)}$, $SS_{(4,3)}$, and $SS_{(1,3)}$. According to the preset rule, a sorting result of the search spaces in the search space group is $SS_{(1,3)}$, $SS_{(2,2)}$, $SS_{(3,3)}$, $SS_{(3,4)}$, $SS_{(4,2)}$, and $SS_{(4,3)}$. Therefore, a sorting sequence number of $SS_{(1,3)}$ is 0, a sorting sequence number of $SS_{(2,2)}$ is 1, a sorting sequence number of $SS_{(3,3)}$ is 2, a sorting sequence number of $SS_{(3,4)}$ is 3, a sorting sequence number of $SS_{(4,2)}$ is 4, and a sorting sequence number of $SS_{(4,3)}$ is 5.

It may be understood that sorting sequence numbers of the search spaces in the search space group may also start from another number. This is not limited in this embodiment.

For the DCI sending method 1, this embodiment provides a blind detection rule 3: when x is not X−1, when blind detection needs to be performed on a search space whose sorting sequence number is x in the search space group, the terminal may perform joint blind detection on the search space whose sorting sequence number is x to a search space whose sorting sequence number is X−1 in the search space group, and the terminal does not need to perform independent blind detection on the search space whose sorting sequence number is x in the search space group. When x is X−1, the terminal performs independent blind detection on the search spaces whose sorting sequence number is X−1 in the search space group.

Figure 28:
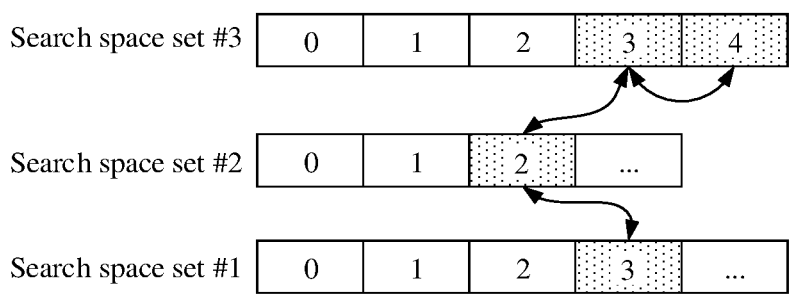
FIG. 28 is a schematic diagram a of search space set and search space group according to the embodiments.
Figure 29:
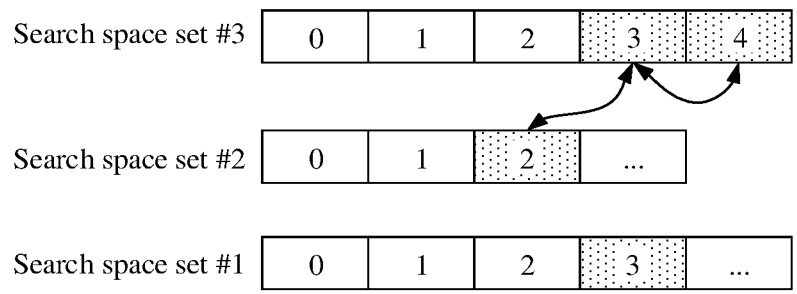
FIG. 29 is a schematic diagram a of search space set and search space group according to the embodiments.
Figure 30:
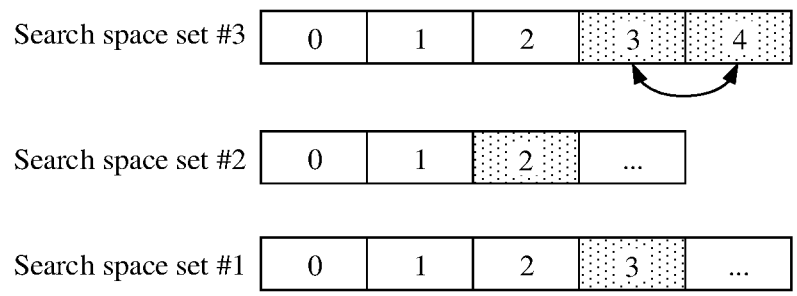
FIG. 30 is a schematic diagram a of search space set and search space group according to the embodiments.

For example, it is assumed that the search space group includes four search spaces, which are respectively $SS_{(1,3)}$, $SS_{(2,2)}$, $SS_{(3,3)}$, and $SS_{(3,4)}$. A sorting sequence number of $SS_{(1,3)}$ is 0, a sorting sequence number of $SS_{(2,2)}$ is 1, a sorting sequence number of $SS_{(3,3)}$ is 2, and a sorting sequence number of $SS_{(3,4)}$ is 3. As shown in FIG. 28, when the terminal needs to perform blind detection on $SS_{(1,3)}$, because $SS_{(1,3)}$, $SS_{(2,2)}$, $SS_{(3,3)}$, and $SS_{(3,4)}$ may carry same DCI, the terminal performs joint blind detection on $SS_{(1,3)}$, $SS_{(2,2)}$, $SS_{(3,3)}$, and $SS_{(3,4)}$. As shown in FIG. 29, when the terminal needs to perform blind detection on $SS_{(2,2)}$, because $SS_{(2,2)}$, $SS_{(3,3)}$, and $SS_{(3,4)}$ may carry same DCI, the terminal performs joint blind detection on $SS_{(2,2)}$, $SS_{(3,3)}$, and $SS_{(3,4)}$. As shown in FIG. 30, when the terminal needs to perform blind detection on $SS_{(3,3)}$, because $SS_{(3,3)}$ and $SS_{(3,4)}$ may carry same DCI, the terminal performs joint blind detection on $SS_{(3,3)}$ and $SS_{(3,4)}$. When the terminal needs to perform blind detection on $SS_{(3,4)}$, the terminal performs independent blind detection on $SS_{(3,4)}$.

In the blind detection rule 3, a quantity of blind detection times corresponding to the first search space set is $\Sigma_L M_{S_{uss}}^{(L)}$. That is, the quantity of blind detection times corresponding to the first search space set is determined based on the quantity of search spaces included in the first search space set.

The following describes the DCI sending method 1 and the blind detection rule 3 by using a case in which the search space group includes only two search spaces.

When the search space group includes only two search spaces, the DCI sending method 1 may be: the network device uses all search spaces in the search space group to carry same DCI; alternatively, if two search spaces in the search space group belong to a same search space set, the network device uses a search space with a relatively large index in the search space group to carry the DCI of the terminal, and other search spaces in the search space group do not carry the DCI of the terminal; alternatively, if two search spaces in the search space group belong to different search space sets, the network device uses a search space with a relatively large set index to carry the DCI, and other search spaces do not carry the DCI of the terminal.

Correspondingly, when the search space group includes only two search spaces, the blind detection rule 3 may be:

(1) The terminal performs joint blind detection on the two first search spaces in the first search space group. In other words, joint blind detection is performed once on the two first search spaces in the first search space group.

(2) The terminal performs joint blind detection on the first search space and the second search space in the second search space group. In other words, joint blind detection is performed once on the first search space and the second search space in the second search space group.

(3) The terminal performs independent blind detection on a search space in the first search space set other than the first search space in the second search space group and the first search space with the smallest index in the first search space group. In other words, in the first search space set, independent blind detection is performed once on each search space other than the first search space in the second search space group and the first search space with the smallest index in the first search space group. That is, in the first search space set, independent blind detection does not need to be performed once on the first search space included in the second search space group, and independent blind detection does not need to be performed once on the first search space with the smallest index in the first search space group.

It is assumed that the first search space set includes $\Sigma_L M_{S_{uss}}^{(L)}$ search spaces, the first search space set corresponds to K search space groups, and there are P first search space groups, L second search space groups, and R third search space groups in the K search space groups. K=P+L+R, K is a positive integer, and P, L, and R are natural numbers.

For (1), a total quantity of times that the terminal performs joint blind detection is P; for (2), a total quantity of times that the terminal performs joint blind detection is L; and for (3), the total quantity of times that the terminal performs independent blind detection is $\Sigma_L M_{S_{uss}}^{(L)}$-P-L.

Therefore, the quantity of blind detection times corresponding to the first search space set may meet the following formula (8):

$$Q = \sum_L M_{S_{uss}}^{(L)} \qquad (8)$$

It can be understood from the formula (8) that the quantity of blind detection times corresponding to the first search space set is determined based on the quantity of search spaces included in the first search space set.

Blind Detection Rule 4

To simplify a blind detection procedure of the terminal, this embodiment provides a DCI sending method 2: when a search space whose sorting sequence number is x in a search space group carries DCI of the terminal, search spaces whose sorting sequence numbers are less than x in the search space group all carry the DCI carried by the search space whose sorting sequence number is x. x is an integer greater than or equal to 0 and less than or equal to X−1. The search space group includes X search spaces, and X is an integer greater than 1.

For the DCI sending method 2, this embodiment provides a blind detection rule 4: when x is not zero, when blind detection needs to be performed on a search space whose sorting sequence number is x in the search space group, the terminal may perform joint blind detection on the search space whose sorting sequence number is zero to a search space whose sorting sequence number is x in the search space group, and the terminal does not need to perform independent blind detection on the search space whose sorting sequence number is x in the search space group. When x is zero, the terminal performs independent blind detection on the search spaces whose sorting sequence number is zero in the search space group.

Figure 31:
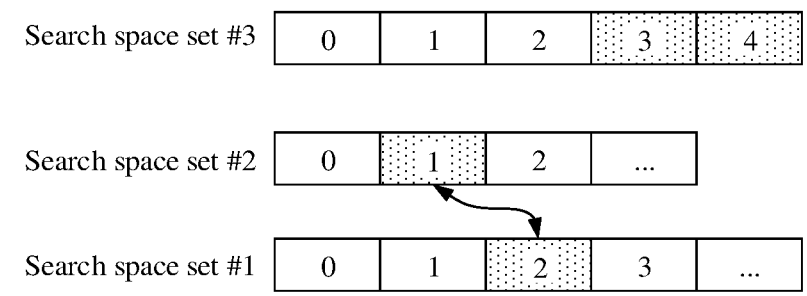
FIG. 31 is a schematic diagram a of search space set and search space group according to the embodiments.
Figure 32:
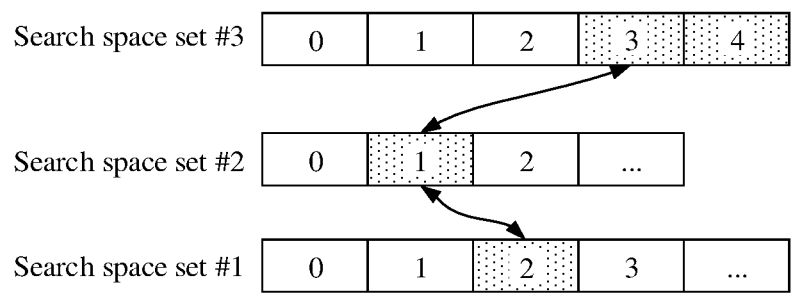
FIG. 32 is a schematic diagram a of search space set and search space group according to the embodiments.
Figure 33:
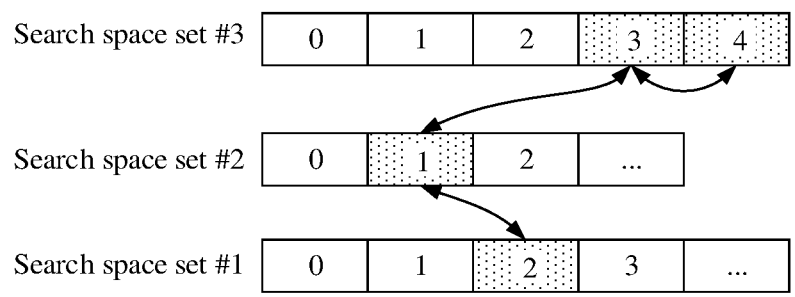
FIG. 33 is a schematic diagram a of search space set and search space group according to the embodiments.

For example, it is assumed that the search space group includes four search spaces, which are respectively $SS_{(1,2)}$, $SS_{(2,1)}$, $SS_{(3,3)}$, and $SS_{(3,4)}$. A sorting sequence number of $SS_{(1,2)}$ is 0, a sorting sequence number of $SS_{(2,1)}$ is 1, a sorting sequence number of $SS_{(3,3)}$ is 2, and a sorting sequence number of $SS_{(3,4)}$ is 3. When the terminal needs to perform blind detection on $SS_{(1,2)}$, the terminal performs independent blind detection on $SS_{(1,2)}$. As shown in FIG. 31, when the terminal needs to perform blind detection on $SS_{(2,1)}$, because $SS_{(2,1)}$ and $SS_{(1,2)}$ may carry same DCI, the terminal performs joint blind detection on $SS_{(2,1)}$ and $SS_{(1,2)}$. As shown in FIG. 32, when the terminal needs to perform blind detection on $SS_{(3,3)}$, because $SS_{(1,2)}$, $SS_{(2,1)}$, and $SS_{(3,3)}$ may carry same DCI, the terminal performs joint blind detection on $SS_{(1,2)}$, $SS_{(2,1)}$, and $SS_{(3,3)}$. As shown in FIG. 33, when the terminal needs to perform blind detection on $SS_{(3,4)}$, because $SS_{(1,2)}$, $SS_{(2,1)}$, $SS_{(3,3)}$, and $SS_{(3,4)}$ may carry same DCI, the terminal performs joint blind detection on $SS_{(1,2)}$, $SS_{(2,1)}$, $SS_{(3,3)}$, and $SS_{(3,4)}$.

In the blind detection rule 4, a quantity of blind detection times corresponding to the first search space set is $\Sigma_L M_{S_{uss}}^{(L)}$. That is, the quantity of blind detection times corresponding to the first search space set is determined based on the quantity of search spaces included in the first search space set.

The following describes the DCI sending method 2 and the blind detection rule 4 by using a case in which the search space group includes only two search spaces.

When the search space group includes only two search spaces, the DCI sending method 2 may be: the network device uses all search spaces in the search space group to carry same DCI; alternatively, if all search spaces in the search space group belong to a same search space set, the network device uses a search space with the smallest index in the search space group to carry the DCI, and other search spaces in the search space group do not carry the DCI; alternatively, if two search spaces in the search space group belong to different search space sets, the network device uses a search space with the smallest set index to carry the DCI, and other search spaces do not carry the DCI.

Correspondingly, when the search space group includes only two search spaces, the blind detection rule 4 may be:

(1) The terminal performs joint blind detection on the two first search spaces in the first search space group. In other words, joint blind detection is performed once on the two first search spaces in the first search space group.

(2) The terminal performs joint blind detection on the first search space and the third search space in the third search space group. In other words, joint blind detection is performed once on the first search space and the third search space in the third search space group.

(3) The terminal performs independent blind detection on a search space in the first search space set other than the first search space in the third search space group and the first search space with the largest index in the first search space group. In other words, in the first search space set, independent blind detection is performed once on each search space other than the first search space in the third search space group and the first search space with the largest index in the first search space group. That is, in the first search space set, independent blind detection does not need to be performed once on the first search space included in the third search space group, and independent blind detection does not need to be performed once on the first search space with the largest index in the first search space group.

It is assumed that the first search space set includes $\Sigma_L M_{S_{uss}}^{(L)}$ search spaces, the first search space set corresponds to K search space groups, and there are P first search space groups, L second search space groups, and R third search space groups in the K search space groups. K=P+L+R, K is a positive integer, and P, L, and R are natural numbers.

For (1), a total quantity of times that the terminal performs joint blind detection is P; for (2), a total quantity of times that the terminal performs joint blind detection is R; and for (3), the total quantity of times that the terminal performs independent blind detection is $\Sigma_L M_{S_{uss}}^{(L)}-P-R$.

Therefore, the quantity of blind detection times corresponding to the first search space set may meet the following formula (9):

$$Q = \sum_L M_{S_{uss}}^{(L)} \qquad (9)$$

It can be understood from the formula (9) that the quantity of blind detection times corresponding to the first search space set is determined based on the quantity of search spaces included in the first search space set.

Blind Detection Rule 5

To simplify a blind detection procedure of the terminal, this embodiment provides a DCI sending method 3: the network device uses all search spaces in the search space group to simultaneously carry same DCI. That is, when a search space in the search space group carries the DCI, another search space in the search space group also carries the same DCI.

For the DCI sending method 3, this embodiment provides a blind detection rule 5: when the terminal needs to perform blind detection on a search space with the smallest sorting sequence number in the search space group, the terminal performs joint blind detection on all the search spaces in the search space group. In this case, the terminal does not need to perform independent blind detection on any search space in the search space group.

Based on the blind detection rule 5, for the first search space set, the terminal performs independent blind detection on a search space in the first search space set other than the first search space included in the search space group. In addition, the terminal performs independent blind detection once on all search spaces in the search space group that does not include the third search space. Therefore, the quantity of blind detection times corresponding to the first search space set may meet the following formula (10):

$$Q = \sum_L M_{S_{uss}}^{(L)} - \sum_{k=1}^{K} N_k + F \qquad (10)$$

F represents a quantity of search space groups that do not include the third search space in the K search space groups.

It can be understood from the formula (10) that the quantity of blind detection times corresponding to the first search space set is determined based on a quantity of search spaces included in the first search space set, a quantity of first search spaces in each search space group in the at least one search space group corresponding to the first search space set, and a quantity of search space groups that do not include a third search space and that are in the at least one search space group corresponding to the first search space set.

It may be understood that, for at least one search space group corresponding to the first search space set, the quantity of first search spaces in each search space group is determined based on the first indication information. In addition, a quantity of search space groups that do not include the third search space and that are in at least one search space group corresponding to the first search space set is determined based on the first indication information.

In an implementation, when the search space group is limited to include only search spaces of a same search space set, a search space group corresponding to the first search space set includes only the first search space. In this case, the formula (10) may be deformed into the following formula (11):

$$Q = \sum_L M_{S_{uss}}^{(L)} - \sum_{k=1}^{K} N_k + K \qquad (11)$$

It can be understood from the formula (11) that the quantity of blind detection times corresponding to the first search space set is determined based on a quantity of search spaces included in the first search space set, a quantity of first search spaces in each search space group in the at least one search space group corresponding to the first search space set, and a quantity of search space groups corresponding to the first search space set.

In another implementation, when the search space group is limited to include only two search spaces, the blind detection rule 5 may be:

(1) The terminal performs joint blind detection on the two first search spaces in the first search space group. In other words, joint blind detection is performed once on the two first search spaces in the first search space group.

(2) The terminal performs joint blind detection on the first search space and the second search space in the second search space group. In other words, joint blind detection is performed once on the first search space and the second search space in the second search space group.

(3) The terminal performs independent blind detection on a search space in the first search space set other than the first search space included in the search space group. In other words, in the first search space set, independent blind detection is performed once on a search space other than the first search space included in the search space group.

It is assumed that the first search space set includes $\Sigma_L M_{S_{uss}}^{(L)}$ search spaces, the first search space set corresponds to K search space groups, and there are P first search space groups, L second search space groups, and R third search space groups in the K search space groups. K=P+L+R, K is a positive integer, and P, L, and R are natural numbers.

For (1), a total quantity of times that the terminal performs joint blind detection is P; for (2), a total quantity of times that the terminal performs joint blind detection is L; and for (3), the total quantity of times that the terminal performs independent blind detection is $\Sigma_L M_{S_{uss}}^{(L)} - 2 \times P - L - R$.

Therefore, the quantity of blind detection times corresponding to the first search space set may meet the following formula (12):

$$Q = \sum_L M_{S_{uss}}^{(L)} - P - R \qquad (12)$$

It can be understood from the formula (12) that the quantity of blind detection times corresponding to the first search space set is determined based on the quantity of search spaces included in the first search space set, the quantity of first search space groups, and the quantity of third search space groups.

Further, when the search space group is limited to include only search spaces of a same search space set, all search space groups corresponding to the first search space set are first search space groups. In this case, the formula (12) may be deformed into the following formula (13):

$$Q = \sum_L M_{S_{uss}}^{(L)} - P \qquad (13)$$

It can be understood from the formula (13) that the quantity of blind detection times corresponding to the first search space set is determined based on the quantity of search spaces included in the first search space set and the quantity of first search space groups.

Blind Detection Rule 6

For the DCI sending method 3, this embodiment further provides the blind detection rule 6: when the terminal performs blind detection on a search space with the largest sorting sequence number in the search space group, the terminal performs joint blind detection on all the search spaces in the search space group. In this case, the terminal does not need to perform independent blind detection on any search space in the search space group.

Optionally, based on the blind detection rule 6, for the first search space set, the terminal performs independent blind detection on a search space in the first search space set other than the first search space included in the search space group. In addition, the terminal performs independent blind detection once on all search spaces in the search space group that does not include the second search space. Therefore, the quantity of blind detection times corresponding to the first search space set may meet the following formula (14):

$$Q = \sum_L M_{S_{uss}}^{(L)} - \sum_{k=1}^{K} N_k + H \qquad (14)$$

H represents a quantity of search space groups that do not include the second search space in the K search space groups.

It can be understood from the formula (14) that the quantity of blind detection times corresponding to the first search space set is determined based on a quantity of search spaces included in the first search space set, a quantity of first search spaces included in each search space group in the at least one search space group corresponding to the first search space set, and a quantity of search space groups that do not include a second search space and that are in the at least one search space group corresponding to the first search space set.

It may be understood that, for at least one search space group corresponding to the first search space set, the quantity of first search spaces included in each search space group is determined based on the first indication information. In addition, a quantity of search space groups that do not include the second search space and that are in at least one search space group corresponding to the first search space set is determined based on the first indication information.

In an implementation, when the search space group is limited to include only search spaces of a same search space set, a search space group corresponding to the first search space set includes only the first search space. In this case, the blind detection rule 5 is the same as the blind detection rule 6, that is: the terminal performs independent blind detection on a search space in the first search space set other than the first search space included in the search space group; and for each search space group corresponding to the first search space set, the terminal performs joint blind detection on all search spaces in the search space group. Therefore, the formula (14) may be deformed into the formula (11). For related descriptions of the formula (11), refer to the foregoing description. Details are not described herein again.

In another implementation, when the search space group is limited to include only two search spaces, the blind detection rule 6 may be:

(1) The terminal performs joint blind detection on the two first search spaces in the first search space group. In other words, joint blind detection is performed once on the two first search spaces in the first search space group.

(2) The terminal performs joint blind detection on the first search space and the third search space in the third search space group. In other words, joint blind detection is performed once on the first search space and the third search space in the third search space group.

(3) The terminal performs independent blind detection on a search space in the first search space set other than the first search space included in the search space group. In other words, in the first search space set, independent blind detection is performed once on a search space other than the first search space included in the search space group.

It is assumed that the first search space set includes $\Sigma_L M_{S_{uss}}^{(L)}$ search spaces, the first search space set corresponds to K search space groups, and there are P first search space groups, L second search space groups, and R third search space groups in the K search space groups. K=P+L+R, K is a positive integer, and P, L, and R are natural numbers.

For (1), a total quantity of times that the terminal performs joint blind detection is P; for (2), a total quantity of times that the terminal performs joint blind detection is R; and for (3), the total quantity of times that the terminal performs independent blind detection is $\Sigma_L M_{S_{uss}}^{(L)} - 2 \times P - L - R$.

Therefore, the quantity of blind detection times corresponding to the first search space set may meet the following formula (15):

$$Q = \sum_L M_{S_{uss}}^{(L)} - P - L \qquad (15)$$

It can be understood from the formula (15) that the quantity of blind detection times corresponding to the first search space set is determined based on the quantity of search spaces included in the first search space set, the quantity of first search space groups, and the quantity of second search space groups.

Further, when the search space group is limited to include only search spaces of a same search space set, all search space groups corresponding to the first search space set are first search space groups. In this case, the formula (15) may be deformed into the formula (13). For related descriptions of the formula (13), refer to the foregoing description. Details are not described herein again.

The foregoing is an example of how to determine the quantity of blind detection times. This is not limited in the embodiments.

In addition, it should be noted that, a blind detection rule specifically to be used by the terminal may be preconfigured in a communication system, or may be determined by the network device by sending indication information. For example, the network device sends the indication information to the terminal, where the indication information is used to indicate the blind detection rule to be used by the terminal. It may be understood that, the blind detection rule includes the blind detection rule 1, the blind detection rule 2, the blind detection rule 3, the blind detection rule 4, the blind detection rule 5, and the blind detection rule 6.

Optionally, a quantity of search spaces included in the first search space set involved in the formula (1) to formula (15) may be replaced with a quantity of valid search spaces included in the first search space set.

It should be noted that, in this embodiment, if one search space and another search space do not have an overlapping part on a time-frequency resource, the search space is a valid search space. If time-frequency resources occupied by two search spaces with a same aggregation level have an overlapping part, only one search space in the two search spaces is considered as a valid search space (in other words, a valid candidate PDCCH).

If time-frequency resources occupied by two search spaces with a same aggregation level have an overlapping part, and the two search spaces respectively belong to two different search space sets, a search space in a search space set with a larger index is considered as a valid search space, and a search space in a search space set with a smaller index is considered as an invalid search space. For example, aggregation levels of $SS_{(3,4)}$ and $SS_{(4,5)}$ are the same, and time-frequency resources occupied by $SS_{(3,4)}$ and $SS_{(4,5)}$ have an overlapping part. In this case, $SS_{(3,4)}$ is considered as the invalid search space, and $SS_{(4,5)}$ is considered as the valid search space.

If time-frequency resources occupied by two search spaces with a same aggregation level have an overlapping part, and the two search spaces respectively belong to two different search space sets, a search space in a search space set with a larger index is considered as an invalid search space, and a search space in a search space set with a smaller index is considered as a valid search space. For example, aggregation levels of $SS_{(3,4)}$ and $SS_{(4,5)}$ are the same, and time-frequency resources occupied by $SS_{(3,4)}$ and $SS_{(4,5)}$ have an overlapping part. In this case, $SS_{(3,4)}$ is considered as the valid search space, and $SS_{(4,5)}$ is considered as the invalid search space.

If time-frequency resources occupied by two search spaces with a same aggregation level have an overlapping part, and the two search spaces belong to a same search space set, it is determined, based on time domain ranges or frequency domain ranges of the two search spaces, which search space of the two search spaces is considered as a valid search space, and which search space is considered as an invalid search space. For example, a search space whose time domain start position is earlier is used as the valid search space, and a search space whose time domain start position is later is used as the invalid search space. For another example, a search space whose frequency domain start position is in front is used as the valid search space, and a search space whose frequency domain start position is in behind is used as the invalid search space.

Based on the solution shown in FIG. 3, the terminal receives the first indication information corresponding to the first search space set, to learn of the search space group corresponding to the first search space set. Therefore, the terminal can determine, based on the search space group corresponding to the first search space set, the quantity of blind detection times corresponding to the first search space set.

Embodiment 2

Figure 34:
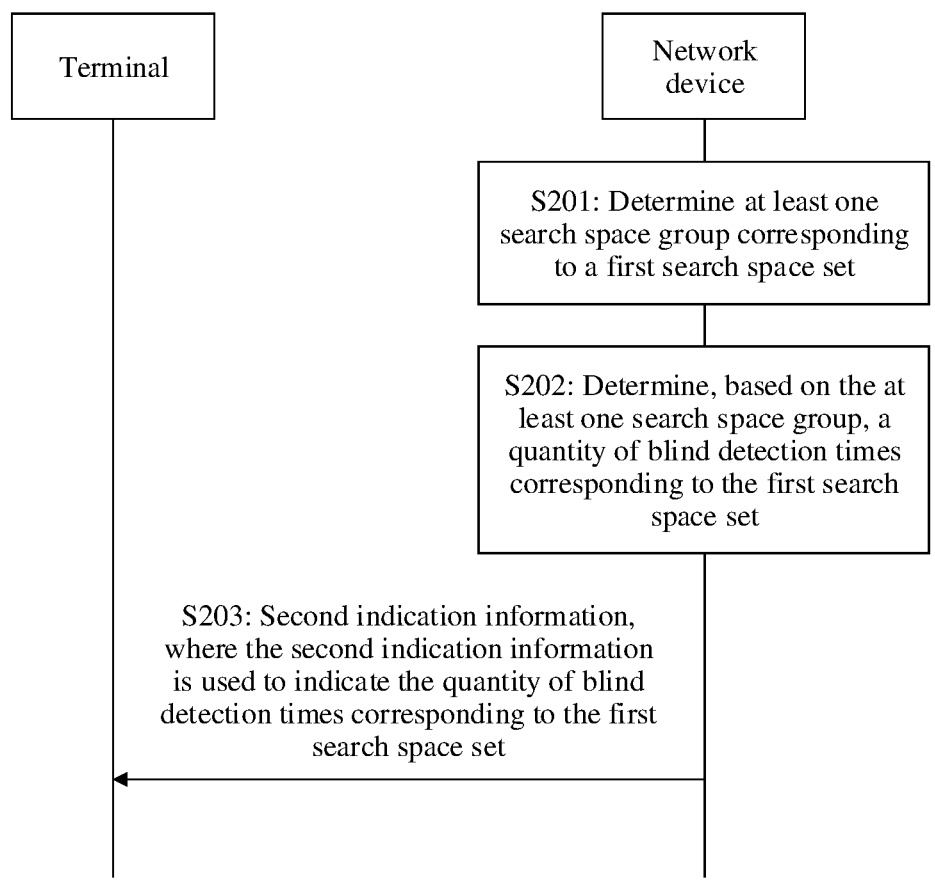
FIG. 34 is a flowchart of another search space blind detection method according to an embodiment.

FIG. 34 shows another search space blind detection method according to an embodiment. The method includes the following steps.

S201: A network device determines at least one search space group corresponding to a first search space set.

It may be understood that, the at least one search space group corresponds to the first search space set, where the at least one search space group may be configured by using higher layer signaling, or may be configured by the network device. The higher layer signaling is signaling, for example, radio link control (RLC) signaling, at a higher-layer protocol layer. This is not limited in this embodiment.

S202: The network device determines, based on the at least one search space group, a quantity of blind detection times corresponding to the first search space set.

For a specific implementation of the step S202, refer to the step S102. Details are not described herein again in this embodiment.

S203: The network device sends second indication information to the terminal.

The second indication information is used to indicate a quantity of blind detection times corresponding to the first search space set. The second indication information may be carried in RRC signaling, medium access control (MAC) control element (CE) signaling, or DCI.

Optionally, the network device further sends first indication information to the terminal. For related descriptions of the first indication information, refer to the foregoing description. Details are not described herein again. In this embodiment, the first indication information and the second indication information may be carried in same signaling or may be carried in different signaling.

Based on the solution shown in FIG. 34, the network device determines the search space group corresponding to the first search space set, to determine the quantity of blind detection times corresponding to the first search space set, and notifies the terminal of the quantity of blind detection times corresponding to the first search space set by using the second indication information. In this way, the terminal can determine, based on the quantity of blind detection times corresponding to the first search space set, whether to perform blind detection on the first search space set.

For ease of understanding by a person of ordinary skill in the art, the following briefly describes a current blind detection procedure.

Step 1: Determine a maximum quantity of times of blind detection on a UE-specific search space by subtracting a quantity of times of blind detection on a common search space from a maximum quantity of times of blind detection on a search space; and determine a quantity of CCEs used for a UE-specific search space by subtracting a quantity of CCEs used for a common search space from a maximum quantity of CCEs.

Step 1 may be represented by using formula as $M_{PDCCH}^{uss}=M_{PDCCH}^{max,slot,\mu}-M_{PDCCH}^{css}$ and $C_{PDCCH}^{uss}=C_{PDCCH}^{max,slot,\mu}-C_{PDCCH}^{css}$.

$M_{PDCCH}^{uss}$ is the maximum quantity of times of blind detection on a UE-specific search space. $M_{PDCCH}^{max,slot,\mu}$ is the maximum quantity of times of blind detection on a search space. $M_{PDCCH}^{css}$ is the quantity of times of blind detection on a common search space. $C_{PDCCH}^{uss}$ is the quantity of CCEs used for a UE-specific search space. $C_{PDCCH}^{max,slot,\mu}$ is the maximum quantity of CCEs. $C_{PSCCH}^{css}$ is the quantity of CCEs used for a common search space.

It should be noted that, the maximum quantity of times of blind detection on a search space and a maximum quantity of times of blind detection on non-overlap (non-overlap) CCEs may be preconfigured.

For example, Table 1 shows a maximum quantity of times of blind detection on search spaces of each cell in each slot. $\mu$ indicates a configuration of a subcarrier spacing. $\mu=0$ indicates that the subcarrier spacing is 15 kHz, and a corresponding maximum quantity of blind detection times $M_{PDCCH}^{max,slot,\mu}$ is 44; $\mu=1$ indicates that the subcarrier spacing is 30 kHz, and a corresponding maximum quantity of blind detection times $M_{PDCCH}^{max,slot,\mu}$ is 36; $\mu=2$ indicates that the subcarrier spacing is 60 kHz, and a corresponding maximum quantity of blind detection times $M_{PDCCH}^{max,slot,\mu}$ is 22; and $\mu=3$ indicates that the subcarrier spacing is 120 kHz, and a corresponding maximum quantity of blind detection times $M_{PDCCH}^{max,slot,\mu}$ is 20.

TABLE 1

| $\mu$ | $M_{PDCCH}^{max,slot,\mu}$ |
|---|---|
| 0 | 44 |
| 1 | 36 |
| 2 | 22 |
| 3 | 20 |

For example, Table 2 shows a maximum quantity of CCEs corresponding to each cell in each slot. $\mu$ indicates a configuration of a subcarrier spacing. $\mu=0$ indicates that the subcarrier spacing is 15 kHz, and a corresponding maximum quantity of CCEs is 56; $\mu=1$ indicates that the subcarrier spacing is 30 kHz, and a corresponding maximum quantity of CCEs is 56; $\mu=2$ indicates that the subcarrier spacing is 60 kHz, and a corresponding maximum quantity of CCEs is 48; and $\mu=3$ indicates that the subcarrier spacing is 120 kHz, and a corresponding maximum quantity of CCEs is 32.

TABLE 2

| $\mu$ | $C_{PDCCH}^{max,slot,\mu}$ |
|---|---|
| 0 | 56 |
| 1 | 56 |
| 2 | 48 |
| 3 | 32 |

Step 2: Sort search space sets in ascending order of indexes (sequence numbers after sorting are 0 to J, where J is a positive integer), and select a search space set with the smallest sorting sequence number.

Step 3: Determine whether to perform blind detection on the search space set. For example, the terminal determines whether a quantity of search spaces in the search space set is greater than the maximum quantity of blind detection times, and whether a quantity of non-overlap CCEs is greater than the quantity of CCEs used for a UE-specific search space.

When the quantity of search spaces in the search space set is not greater than the maximum quantity of blind detection times, and the quantity of non-overlap CCEs is not greater than the quantity of CCEs used for a UE-specific search space, the terminal performs blind detection on the search space set, and updates the maximum quantity of blind detection times and the quantity of CCEs used for a UE-specific search space. Otherwise, the terminal performs step 4.

It should be noted that, updating the maximum quantity of blind detection times means subtracting a quantity of candidate PDCCHs included in the search space set from the current maximum quantity of blind detection times. Updating the quantity of CCEs used for a UE-specific search space means subtracting a quantity of CCEs occupied by the search space set from the current quantity of CCEs used for a UE-specific search space.

Step 4: Select a next search space set, and repeat step 3.

For example, the following represents step 2 and step 4 in a form of pseudocode.

Set j = 0
while $\Sigma_L M_{S_{uss}(j)}^{(L)} \leq M_{PDCCH}^{USS}$ and $C(V_{CCE}(S_{uss}(j))) \leq C_{PDCCH}^{uss}$
   allocate $\Sigma_L M_{S_{uss}(j)}^{(L)}$ monitored PDCCH candidates to UE-specific search space -continued

```
set S_uss (j)
    M_PDCCH^USS = M_PDCCH^USS - Σ_L M_{S_uss(j)}^{(L)}
    C_PDCCH^uss = C_PDCCH^uss - C (V_CCE (S_uss(j)))
    j = j + 1
end while
```

It should be noted that, $S_{uss}(j)$ represents a UE-specific search space set whose sorting sequence number is j. $\Sigma_L M_{S_{uss}(j)}^{(L)}$ indicates a quantity of candidate PDCCHs at each aggregation level in $S_{uss}(j)$, and L indicates the aggregation level. $C(V_{CCE}(S_{uss}(j)))$ indicates the quantity of CCEs occupied by $S_{uss}(j)$.

The foregoing describes the blind detection procedure. For specific details, refer to the 38.213 protocol in 3GPP. Details are not described herein again.

It should be noted that, in a case of PDCCH repetition, the terminal needs to perform joint blind detection on search spaces that carry same DCI, to effectively improve a success rate of blind detection of DCI. However, in a current blind detection procedure, the terminal only needs to perform independent blind detection on candidate PDCCHs at each aggregation level included in one search space set, and there is no procedure of performing joint blind detection on a plurality of search spaces. It can be understood that, the current blind detection procedure is not applicable to the PDCCH repetition scenario.

Figure 35:
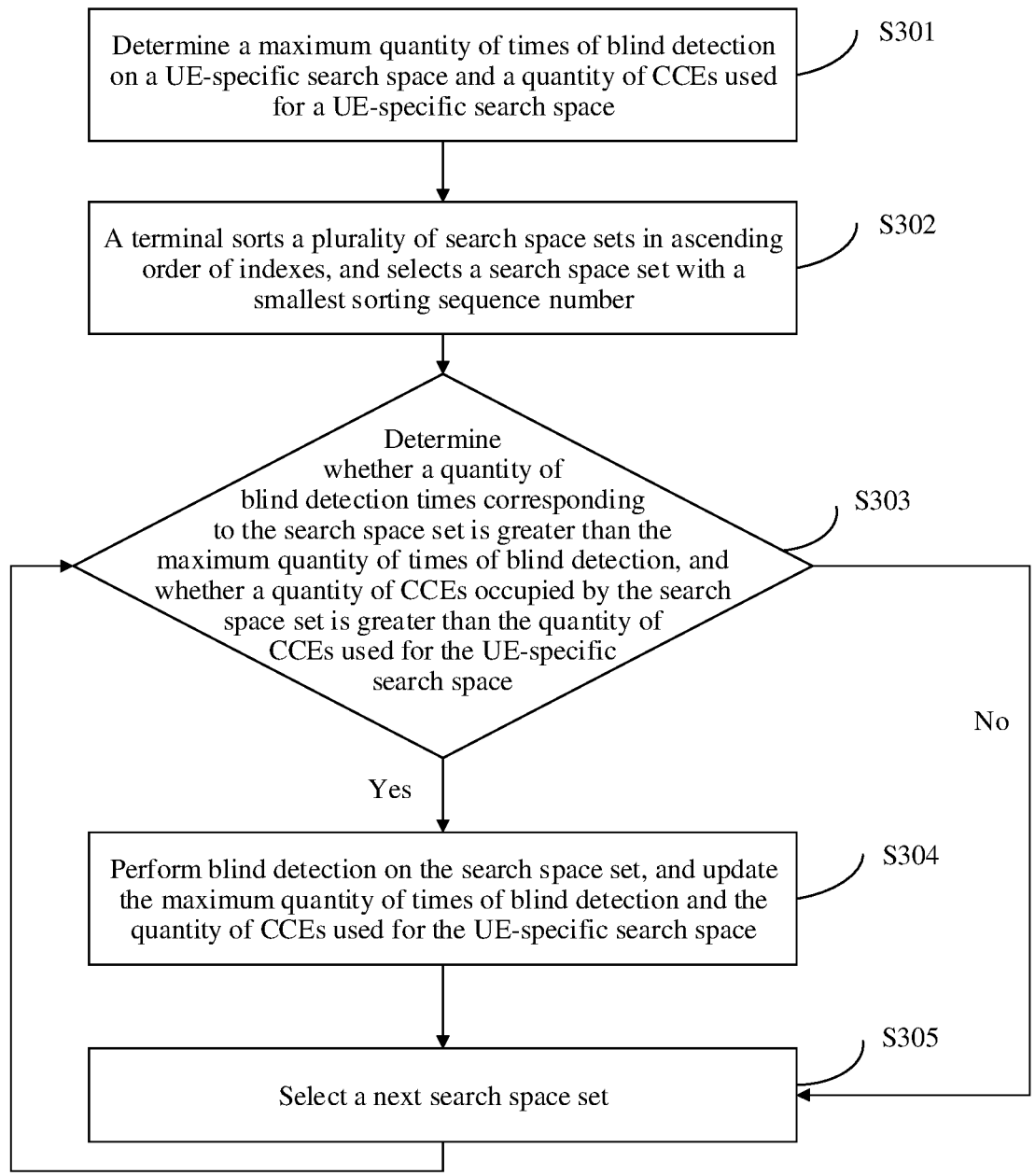
FIG. 35 is a flowchart of another search space blind detection method according to an embodiment.

To resolve the foregoing problem, based on the solution shown in FIG. 3 or FIG. 34, an embodiment provides a blind detection procedure, to be applicable to the PDCCH repetition scenario. As shown in FIG. 35, the method includes the following steps.

S301: The terminal determines a maximum quantity of times of blind detection on a UE-specific search space and a quantity of CCEs used for a UE-specific search space.

In an implementation, the maximum quantity of times of blind detection on a UE-specific search space is determined by subtracting a quantity of times of blind detection on a common search space from a maximum quantity of times of blind detection on a search space; and the quantity of CCEs used for a UE-specific search space is determined by subtracting a quantity of CCEs used for a common search space from a maximum quantity of CCEs.

For specific descriptions of S301, refer to the foregoing description of step 1. Details are not described herein again.

S302: The terminal sorts a plurality of search space sets in ascending order of indexes, and selects a search space set with the smallest sorting sequence number.

S303: Determine whether to perform blind detection on the search space set. In an implementation, it is determined whether a quantity of blind detection times corresponding to the search space set is greater than the maximum quantity of blind detection times, and whether a quantity of CCEs occupied by the search space set is greater than the quantity of CCEs used for a UE-specific search space.

S304: When the quantity of blind detection times corresponding to the search space set is not greater than the maximum quantity of blind detection times, and the quantity of non-overlap CCEs is not greater than the quantity of CCEs used for a UE-specific search space, the terminal performs blind detection on the search space set, and updates the maximum quantity of blind detection times and the quantity of CCEs used for a UE-specific search space. Otherwise, the terminal performs step S305.

It should be noted that, updating the maximum quantity of blind detection times means subtracting a quantity of blind detection times corresponding to the search space set from the current maximum quantity of blind detection times. Updating the quantity of CCEs used for a UE-specific search space means subtracting a quantity of CCEs occupied by the search space set from the current quantity of CCEs used for a UE-specific search space.

S305: The terminal selects a next search space set, and repeats step S303.

In an implementation, the terminal selects the next search space set in ascending order of sorting sequence numbers.

For example, the following represents step S302 to S305 in a form of pseudocode.

```
Set j = 0
while Q(j) ≤ M_PDCCH^USS and C(V_CCE(S_uss(j))) ≤ C_PDSSH^uss
    M_PDCCH^USS = M_PDCCH^USS - Q(j)
    C_PDCCH^uss = C_PDCCH^uss - C (V_CCE(S_uss(j)))
    j = j + 1
end while
```

It should be noted that, Q(j) is a quantity of blind detection times corresponding to a search space set whose sorting sequence number is j. It may be understood that, Q(j) may be determined according to the solution shown in FIG. 3 or FIG. 28. In the embodiments, one blind detection rule corresponds to one method for determining a quantity of blind detection times. That is, when a terminal determines that blind detection needs to be performed on a search space set, the terminal performs blind detection on the search space set according to a blind detection rule (for example, one of the blind detection rule 1 to the blind detection rule 6) corresponding to a method for determining a quantity of blind detection times of the search space set.

The foregoing mainly describes the solutions provided in the embodiments from a perspective of interaction between network elements. It may be understood that, to implement the foregoing functions, each of network elements such as the network device and the terminal includes a corresponding hardware structure, a corresponding software module, or a combination thereof for performing each function. A person of ordinary skill in the art should easily be aware that, in combination with units and algorithm steps of the examples described in the embodiments disclosed, the embodiments may be implemented by hardware or a combination of hardware and computer software. Whether a function is performed by hardware or hardware driven by computer software depends on particular applications and design constraints of the solutions. A person of ordinary skill in the art may use different methods to implement the described functions for each particular application, but it should not be considered that the implementation goes beyond the scope of the embodiments.

In this embodiment, functional modules of the network device and the terminal may be obtained through division based on the foregoing method examples. For example, each functional module may be obtained through division based on each corresponding function, or two or more functions may be integrated into one processing module. The foregoing integrated module may be implemented in a form of hardware, or may be implemented in a form of a software function module. It should be noted that in the embodiments, division into the modules is an example and is merely logical function division and may be other division during actual implementation. An example in which each function module is obtained through division based on each corresponding function is used below for description.

Figure 36:
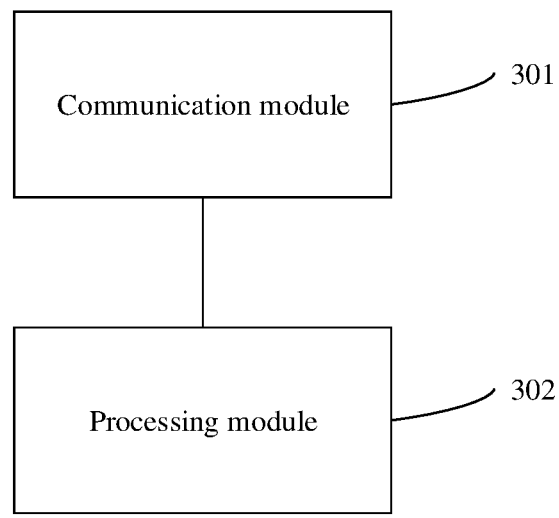
FIG. 36 is a schematic structural diagram of a terminal according to an embodiment.

FIG. 36 is a schematic structural diagram of a terminal according to an embodiment. As shown in FIG. 36, the terminal includes a communication module 301 and a processing module 302. The communication module 301 is configured to support the terminal in performing step S101 in FIG. 3 and step S203 in FIG. 34, or is configured to support another process in the solutions described in the embodiments. The processing module 302 is configured to support the terminal in performing step S102 in FIG. 3 and step S301 to S305 in FIG. 35, or is configured to support another process in the solutions described in the embodiments.

In an example, with reference to the terminal shown in FIG. 2, the communication module 301 in FIG. 36 may be implemented by the transceiver 103 in FIG. 2, and the processing module 302 in FIG. 36 may be implemented by the processor 101 in FIG. 2. This is not limited in this embodiment.

An embodiment further provides a computer-readable storage medium. The computer-readable storage medium stores computer instructions. When the computer-readable storage medium runs on the terminal shown in FIG. 2, the terminal is enabled to perform the method shown in FIG. 3, FIG. 34, or FIG. 35. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium, a semiconductor medium (for example, a solid-state drive (SSD)), or the like.

An embodiment further provides a computer program product including computer instructions. When the computer program product runs on the terminal shown in FIG. 2, the terminal is enabled to perform the method shown in FIG. 3, FIG. 34, or FIG. 35.

The terminal, the computer storage medium, and the computer program product provided in the embodiments are all configured to perform the methods provided above. Therefore, for beneficial effects that can be achieved thereof, refer to the beneficial effects corresponding to the methods provided above. Details are not described herein again.

Figure 37:
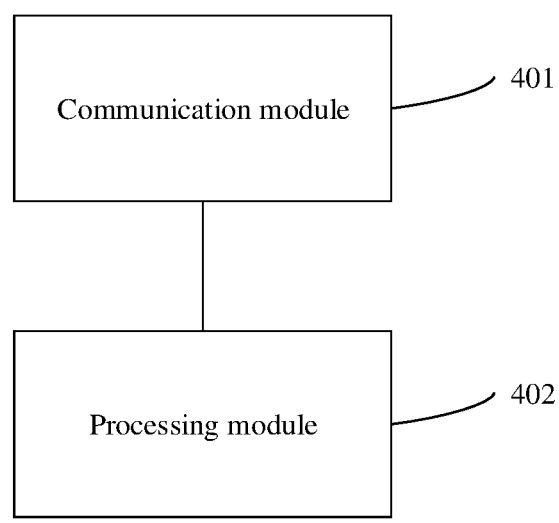
FIG. 37 is a schematic structural diagram of a network device according to an embodiment.

FIG. 37 is a schematic structural diagram of a network device according to an embodiment. As shown in FIG. 37, the network device includes a communication module 401 and a processing module 402. The communication module 401 is configured to support the network device in performing step S101 in FIG. 3 and step S203 in FIG. 34, or is configured to support another process in the solutions described in the embodiments. The processing module 402 is configured to support the network device in performing step S201 and S202 in FIG. 34, or is configured to support another process in the solutions described in the embodiments.

In an example, with reference to the network device shown in FIG. 2, the communication module 401 in FIG. 37 may be implemented by the transceiver 203 in FIG. 2, and the processing module 402 in FIG. 37 may be implemented by the processor 201 in FIG. 2. This is not limited in this embodiment.

An embodiment further provides a computer-readable storage medium. The computer-readable storage medium stores computer instructions. When the computer-readable storage medium runs on the network device shown in FIG. 2, the network device is enabled to perform the method shown in FIG. 3 or FIG. 34. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium, a semiconductor medium (for example, a solid-state drive), or the like.

An embodiment further provides a computer program product including computer instructions. When the computer program product runs on the network device shown in FIG. 2, the network device is enabled to perform the method shown in FIG. 3 or FIG. 34.

The network device, the computer storage medium, and the computer program product provided in the embodiments are all configured to perform the methods provided above. Therefore, for beneficial effects that can be achieved thereof, refer to the beneficial effects corresponding to the methods provided above. Details are not described herein again.

Figure 38:
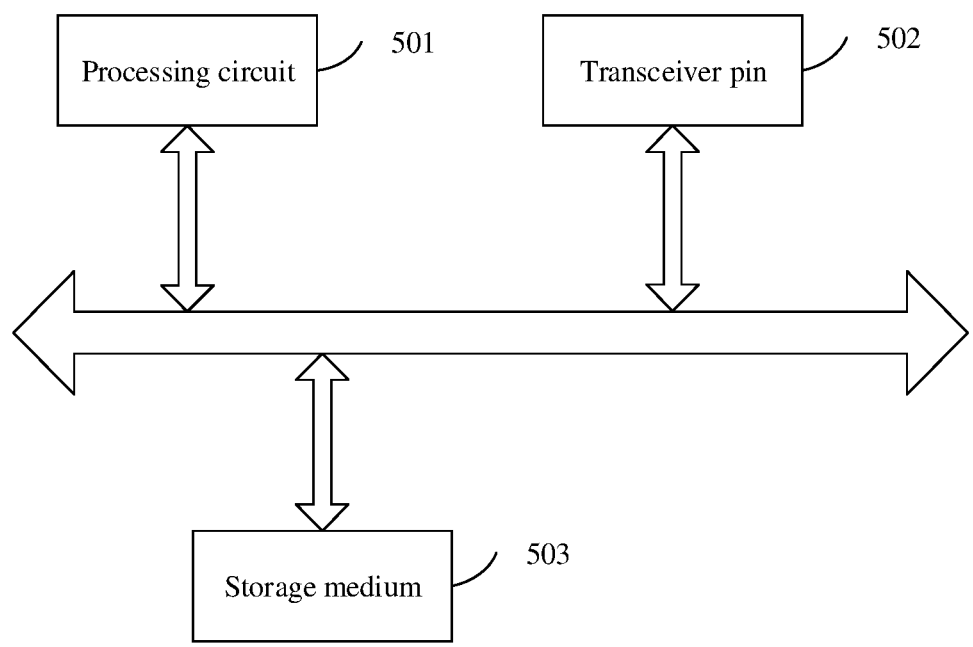
FIG. 38 is a schematic structural diagram of a chip according to an embodiment.

FIG. 38 is a schematic structural diagram of a chip according to an embodiment. The chip shown in FIG. 38 may be a general-purpose processor, or may be a dedicated processor. The chip includes a processing circuit 501 and a transceiver pin 502. The processing circuit 501 is configured to support the communication apparatus in performing the solution shown in FIG. 3, FIG. 34, or FIG. 35. The transceiver pin 502 is configured to be controlled by the processing circuit 501, and is configured to support the communication apparatus in performing the solution shown in FIG. 3, FIG. 34, or FIG. 35.

Optionally, the chip shown in FIG. 38 may further include a storage medium 503.

It should be noted that the chip shown in FIG. 38 may be implemented by using the following circuit or component: one or more field programmable gate arrays (FPGA), a programmable logic device (PLD), a controller, a state machine, gate logic, a discrete hardware component, any other appropriate circuit, or any combination of circuits that can perform various functions described in the embodiments.

A person of ordinary skill in the art may understand and implement another variation of the disclosed embodiments by viewing the accompanying drawings and embodiments. A single processor or another unit may implement several functions enumerated in the claims. Some measures are recorded in dependent claims that are different from each other, but this does not mean that these measures cannot be combined to produce a better effect.

Further, it is clear that various modifications and combinations may be made to them without departing from the spirit and scope of the embodiments. Correspondingly, the embodiments and the accompanying drawings are merely example descriptions, and are intended to cover any of or all modifications, variations, combinations, or equivalents. It is clear that, a person skilled in the art can make various modifications and variations to the embodiments without departing from the spirit and scope of the embodiments.

What is claimed is:

1. A search space blind detection method, comprising:
receiving indication information corresponding to a first search space set, wherein the indication information is used to indicate at least one search space group corresponding to the first search space set, the at least one search space group comprises at least two search spaces having an association relationship, and at least one search space in the at least one search space group belongs to the first search space set, and search spaces in the first search space set are sorted in an ascending order of aggregation levels; and
determining, based on the indication information, a quantity of blind detection times corresponding to the first search space set.

2. The search space blind detection method according to claim 1, wherein the at least one search space group comprises at least one of a first search space group, a second search space group, and a third search space group;
the first search space group comprises two first search spaces;
the second search space group comprises one first search space and one second search space; and
the third search space group comprises one first search space and one third search space, wherein the first search space belongs to the first search space set, the second search space belongs to a second search space set, and the third search space belongs to a third search space set;
an index of the first search space set is less than an index of the second search space set; and
the index of the first search space set is greater than an index of the third search space set.

3. The search space blind detection method according to claim 2, wherein
the quantity of blind detection times corresponding to the first search space set is determined based on a quantity of candidate physical downlink control channels (PDCCH) in the first search space set and a quantity of first search space groups, wherein the quantity of first search space groups is determined based on the indication information.

4. The search space blind detection method according to claim 2, wherein the quantity of blind detection times corresponding to the first search space set is determined based on a quantity of candidate physical downlink control channels (PDCCH) in the first search space set, a quantity of first search space groups, and a quantity of second search space groups, wherein the quantity of first search space groups and the quantity of second search space groups are determined based on the indication information.

5. The search space blind detection method according to claim 2, wherein the quantity of blind detection times corresponding to the first search space set is determined based on a quantity of candidate physical downlink control channels (PDCCH) in the first search space set, a quantity of first search space groups, and a quantity of third search space groups, wherein the quantity of first search space groups and the quantity of third search space groups are determined based on the indication information.

6. A communication apparatus, comprising:
at least one processor and one or more memories, wherein the one or more memories are coupled to the at least one processor and store programming instructions for execution by the at least one processor to:
receive indication information corresponding to a first search space set, wherein the indication information is used to indicate at least one search space group corresponding to the first search space set, the at least one search space group comprises at least two search spaces having an association relationship, at least one search space in the at least one search space group belongs to the first search space set, and search spaces in the first search space set are sorted in an ascending order of aggregation levels; and
determine, based on the indication information, a quantity of blind detection times corresponding to the first search space set.

7. The apparatus according to claim 6, wherein the at least one search space group comprises at least one of a first search space group, a second search space group, and a third search space group;
the first search space group comprises two first search spaces;
the second search space group comprises one first search space and one second search space; and
the third search space group comprises one first search space and one third search space, wherein
the first search space belongs to the first search space set, the second search space belongs to a second search space set, and the third search space belongs to a third search space set; an index of the first search space set is less than an index of the second search space set; and
the index of the first search space set is greater than an index of the third search space set.

8. The apparatus according to claim 7, wherein the one or more memories store the programming instructions for execution by the at least one processor further to: determine a quantity of first search space groups based on the indication information; and determine the quantity of blind detection times corresponding to the first search space set based on a quantity of candidate physical downlink control channels (PDCCH) in the first search space set and the quantity of first search space groups.

9. The apparatus according to claim 7, wherein the one or more memories store the programming instructions for execution by the at least one processor further to: determine a quantity of first search space groups and a quantity of second search space groups based on the indication information; and determine the quantity of blind detection times corresponding to the first search space set based on a quantity of candidate physical downlink control channels (PDCCH) in the first search space set, the quantity of first search space groups, and the quantity of second search space groups.

10. The apparatus according to claim 7, wherein the one or more memories store the programming instructions for execution by the at least one processor further to: determine a quantity of first search space groups and a quantity of third search space groups based on the indication information; and determine the quantity of blind detection times corresponding to the first search space set based on a quantity of candidate physical downlink control channels (PDCCH) in the first search space set, the quantity of first search space groups, and the quantity of third search space groups.

11. The apparatus according to claim 6, wherein the apparatus is a terminal device.

12. A communication apparatus, comprising:
at least one processor and one or more memories, wherein the one or more memories are coupled to the at least one processor and store programming instructions for execution by the at least one processor to:
determine indication information; and
send the indication information corresponding to a first search space set, wherein the indication information indicates at least one search space group corresponding to the first search space set, the at least one search space group comprises at least two search spaces having an association relationship, at least one search space in the at least one search space group belongs to the first search space set, and search spaces in the first search space set are sorted in an ascending order of aggregation levels.

13. The apparatus according to claim 12, wherein the at least one search space group comprises at least one of a first search space group, a second search space group, and a third search space group;
the first search space group comprises two first search spaces;
the second search space group comprises one first search space and one second search space; and
the third search space group comprises one first search space and one third search space, wherein the first search space belongs to the first search space set, the second search space belongs to a second search space set, and the third search space belongs to a third search space set; an index of the first search space set is less than an index of the second search space set; and the index of the first search space set is greater than an index of the third search space set.

14. The apparatus according to claim 13, wherein the quantity of blind detection times corresponding to the first search space set is determined based on a quantity of candidate physical downlink control channels (PDCCH) in the first search space set and a quantity of first search space groups, wherein the quantity of first search space groups is determined based on the indication information.

15. The apparatus according to claim 13, wherein the quantity of blind detection times corresponding to the first search space set is determined based on a quantity of candidate physical downlink control channels (PDCCH) in the first search space set, a quantity of first search space groups, and a quantity of second search space groups, wherein the quantity of first search space groups and the quantity of second search space groups are determined based on the indication information.

16. The apparatus according to claim 13, wherein the quantity of blind detection times corresponding to the first search space set is determined based on a quantity of candidate physical downlink control channels (PDCCH) in the first search space set, a quantity of first search space groups, and a quantity of third search space groups, wherein the quantity of first search space groups and the quantity of third search space groups are determined based on the indication information.

17. The apparatus according to claim 12, wherein the apparatus is a network device.

* * * * *